United States Patent
Mishra et al.

(10) Patent No.: US 12,375,525 B1
(45) Date of Patent: Jul. 29, 2025

(54) DETECTION OF DOMAIN NAMES GENERATED BY A DOMAIN GENERATION ALGORITHM USING A WIDE AND DEEP LEARNING ARCHITECTURE

(71) Applicant: Splunk, Inc., San Francisco, CA (US)

(72) Inventors: Abhinav Mishra, San Francisco, CA (US); Kumar Sharad, Dresden (DE); Namratha Sreekanta, Fremont, CA (US); Philipp Drieger, Munich (DE); Glory Emmanuel Avina, Brentwood, CA (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 17/978,151

(22) Filed: Oct. 31, 2022

Related U.S. Application Data

(60) Provisional application No. 63/411,500, filed on Sep. 29, 2022.

(51) Int. Cl.
    *H04L 9/40* (2022.01)
(52) U.S. Cl.
    CPC ...... *H04L 63/1483* (2013.01); *H04L 63/1425* (2013.01)
(58) Field of Classification Search
    CPC .................. H04L 63/1483; H04L 63/1425
    See application file for complete search history.

(56) References Cited

U.S. PATENT DOCUMENTS

| | | |
|---|---|---|
| 7,937,344 B2 | 5/2011 | Baum et al. |
| 8,112,425 B2 | 2/2012 | Baum et al. |
| 8,751,529 B2 | 6/2014 | Zhang et al. |
| 8,788,525 B2 | 7/2014 | Neels et al. |
| 9,215,240 B2 | 12/2015 | Merza et al. |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Joe Chacko
(74) *Attorney, Agent, or Firm* — Rutan & Tucker, LLP; Kyle M. St. James

(57) ABSTRACT

A computer-implemented method for detecting malicious content is disclosed that includes operations of: receiving a character set as an input, converting the input into an integer array containing indexes of each character, and creating an input vector from the integer array, the input vector being a dense numerical representation of the character set. The input vector is passed to a machine learning model to generate a plurality of features based on the character set, the plurality of features comprising at least two of: a length of the character set, a Shannon Entropy of the character set, n-gram similarity score of the character set with English dictionary words, n-gram similarity score of the character set with a set of legitimate domains, and an online web traffic ranking service. A dense input vector is formed by concatenating the plurality of features to the input vector, and then processed to obtain a comparison score.

20 Claims, 11 Drawing Sheets

(56) References Cited

U.S. PATENT DOCUMENTS

| | | |
|---|---|---|
| 9,286,413 B1 | 3/2016 | Coates et al. |
| 10,127,258 B2 | 11/2018 | Lamas et al. |
| 11,908,140 B1* | 2/2024 | Li .......................... G06T 7/0014 |
| 2019/0098106 A1 | 3/2019 | Mungel et al. |
| 2020/0059451 A1* | 2/2020 | Huang ................... G06N 3/044 |
| 2020/0267182 A1* | 8/2020 | Highnam ............. H04L 63/0236 |
| 2022/0245461 A1* | 8/2022 | Sern ....................... G06F 21/566 |
| 2022/0417261 A1* | 12/2022 | Rashidi ................. G06F 16/245 |
| 2023/0079326 A1* | 3/2023 | Chang ................. H04L 63/1483 |
| | | 726/22 |

OTHER PUBLICATIONS

Carraso, David, "Exploring Splunk," published by CITO Research, New York, NY, Apr. 2012.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

DETECTION OF DOMAIN NAMES GENERATED BY A DOMAIN GENERATION ALGORITHM USING A WIDE AND DEEP LEARNING ARCHITECTURE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

With significant progress in information society, users have shared more personal and private information to online service and content providers in exchange for real-time seamless access to their accounts, online services, and data. In general, users store and link their bank accounts, credit cards, personal information, devices, and physical location across dozens of mobile applications and online services that talk to each other to track user activity and obtain personal or private information on a near constant basis. In an effort to help users track their private information and account activity, online service and content providers offer various online and offline communications means to alert users when fraudulent or suspicious access or activity occurs.

These alerts and notifications are often targets for malicious entities that send malware to users that mimic legitimate communications in an attempt to steal user's personal and private information. Further compounding the issue of tracking personal or private information and online activity, malicious entities use similar patterns and approaches in distributing online and offline communications enticing users to provide their online credentials to illegitimate sources to stay informed or secure. In the past malicious entities and communications were more recognizable and discrete, however current threats are more advanced, using artificial intelligence (AI) and machine learning (ML) to manufacture malicious communications that are much more difficult for users and computers to detect and filter. One of the problems in identifying malicious communications is that they often closely mimic the look and feel of legitimate communications making it difficult for filters and users to determine whether the communication is from a legitimate source. Another problem in identifying malicious communications stems from the use of domain generation algorithms (DGA) that generate and test thousands of domain names to host and spread malicious communications making it difficult for programs and filters to detect unseen or unknown domain names or other attributes of the malicious communication. Another problem in identifying malicious communications is that a large number of malicious communications are dynamically created using growing dictionaries and lists of legitimate domain names. Conventional solutions for detecting these advanced threats rely on static matching or static lists have quickly become outdated and unreliable and fail to keep up with quickly growing dictionaries of malicious domains names. Moreover, current solutions lack flexibility and accuracy in detecting the varying patterns used to create malicious domain names, where many solutions either fail to detect nuances used in generating malicious domain names and other solutions yield numerous false positives.

BRIEF DESCRIPTION OF THE DRAWINGS

Illustrative examples are described in detail below with reference to the following figures.

Figure 1:
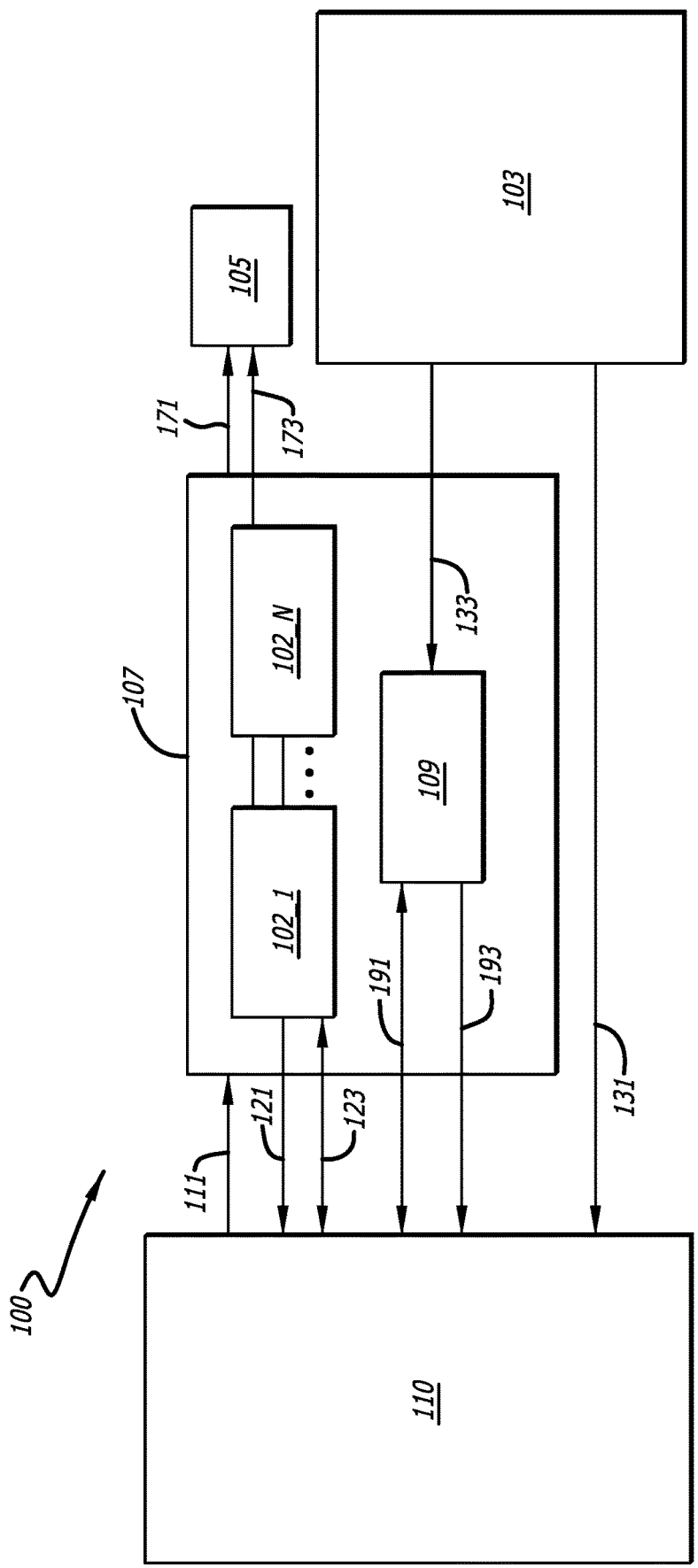
FIG. 1 is a block diagram of an example machine learning architecture that may be used to determine a domain generated by a domain generation algorithm, in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

Domain generation algorithms, or DGAs, generate domains that are used as rendezvous points where an infected machine or botnet hosts malware and a command and control (C&C) server connects to keep the scheme going. At various or predetermined intervals, a DGA generates new names for its C&C server using one of several techniques: a randomly generated set of numbers or letters tacked on a top-level domain suffix (e.g., .com or .org), a pseudo-random number generator to produce number sequences that appear like they are random, or a mashup of words or construct hexadecimal strings. These and other techniques work as long as the characters used are acceptable as part of a domain name. Further, DGAs can be configured to register a new domain at any frequency-every day, hour, or even minute. When a DGA fuels malware attacks, the C&C server's IP address and domain name can quickly switch, presenting a real challenge in filtering or blocking DGA generated domains.

Further, throughout this disclosure the terms "non-DGA-generated" or "legitimate" are used interchangeably and describe legitimate domain names that are not a threat, legitimate or safe. Whereas, the terms "malicious" or "DGA-generated" domain names are used interchangeably and describe non-legitimate domain names that are DGA generated and malicious in nature, disturbing or creating a computer or network threat.

In response to the problems described above, devices and methods are discussed herein to provide a means for configuring a comprehensive and/or custom DGA-generated domain detection system utilizing deep and wide machine learning to detect domains generated by domain generation algorithms which may be used in creating security threats such as malware. In brief, the disclosed embodiments describe using various wide and deep layers of a machine learning architecture, for example, output units, hidden layers, dense embeddings, sparse features, and the like, and examples for obtaining better representation of the input data by using one or more relevant custom set of features. Then the feature vector, that includes domain text embeddings and custom features, may undergo a training phase using one or more relevant machine learning process to learn a model that produces better, more accurate results during a prediction phase for detecting domain names generated by DGAs.

These solutions can be configured for other environments as well, for example, mining datasets or environments (e.g., botnet, DGA subclasses, legitimate domain names, etc.,) to detect various security threats by learning and adapting to the environment in which security threats were created. Moreover, these solutions can quickly and accurately learn rules and features of domain generation algorithms to detect whether a created domain name is a legitimate domain name or a security threat (e.g., malware). Further, these solutions can learn with the growing dictionary and legitimate domain name lists thereby adapting to the nuances and varying patterns used in creating anomalous and malicious domain names while reducing false positives.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternative embodiments of like elements.

FIG. 1 is a block diagram of an example machine learning architecture that may be used, for example, to determine a domain generated by a domain generation algorithm (DGA) in accordance with an embodiment of the disclosure. The machine learning architecture 100 includes data intake and query system 110 that obtains data from one or more container environments 107 and one or more data science clients 103 in the machine learning architecture 100, and ingests the data using an indexing system.

The data intake and query system 110 may include a user interface system that provides the mechanisms through which users associated with the machine learning architecture 100 (and possibly others) can interact with the data intake and query system 110. These interactions can include configuration, administration, and management of the data intake and query system 110, initiation and/or scheduling of queries that are to be processed by a search system, receipt or reporting of search results, and/or visualization of search results. The user interface system can include, for example, a command line interface or a web-based interface. The search system of the data intake and query system 110 enables users to navigate the indexed data.

The container environments 107 may include container technologies and container orchestration systems for automating software deployment, scaling, load balancing, and management and may include container and/or orchestration systems such as, for example, DOCKER®, KUBERNETES®, and OPENSHIFT®. The container environments 107 may be instantiated, setup and managed by a remote user, customer, or client. The data intake and query system 110 and container environments 107 together provide an interface for a platform with advanced data science, machine learning, and deep learning use cases including observability. The machine learning architecture 100 may provide clients with guided workflows and customizable neural networks that work with users' datasets thereby allowing clients to be a neural network designer giving them the option to define their dataset, train their neural network model, and evaluate the model.

The data intake and query system 110 may include one or more interfaces or utilities, for example, a toolkit, a dashboard, or UI components, or any combination thereof allowing users to run specific models and access various commands within the container environment 107 as well as utilize integration of start and stop container and container management control.

The data science client 103 may be a computing device or remote machine where users provide the model and code to be executed within container environment 107. The container environment 107 processes machine learning models and code as well as other information provided by the user and passes the result to data intake and query system 110 for further processing. The data science client 103 may provide container data 133 in the form of, for example, external Uniform Resource Locator (URLs) to a container development environment 109. The data science client 103 may also request web access to data intake and query system 110 through one or more web queries 131. The data science client 103 may connect container and client endpoints to data intake and query system 110. In some embodiments, the data science client 103 may pass external URLs and query directly to the container environment 107, and the container environment 107 may process and/or pass the query to the data intake and query system 110.

The container environment 107 receives, stores and executes one or more production models 102_1 . . . 102_N (hereinafter "production models 102"). The production models 102 may be provided by at least one of a user, data science client 103, or data intake and query system 110, or may be included in the container environment 107, or any combination thereof. The production models 102 pass data, dataset, and other processing information to data intake and query system 110 for further processing as described above.

The container environment 107 also provides development environment 109 (development environment information and variables) as stored in container environment 107 and/or received by data science client 103.

The data intake and query system 110 may provide container environment variable 111, for example, configuration information (e.g., required container environment configuration details), or processing instructions for various container or orchestration systems such as, for example, DOCKER®, KUBERNETES®, and OPENSHIFT®, to container environment 107. The container environment variable 111 may be provided to the container environment 107 via standard or proprietary application programming interfaces (APIs).

The data intake and query system 110 may receive, through an HTTP Event Collector (HEC) path 121, raw output data and output results from production models 102. A HEC path 121 is a collector that allows the various components within container environment 107 to send data and application events to the data intake and query system 110 over HyperText Transfer Protocol (HTTP) or Secure HTTP (HTTPS) protocols. In some embodiments, each production model 102 may be configured to transmit data via a separately configured HEC path 121 (e.g., through a REST API provided by the HEC path). As such, raw output data may be transmitted directly from each of production models 102_1 . . . 102_N to data intake and query system 110, without waiting to send all raw output data, along with the output results, via a single HEC path once the output results from one or more production models are obtained. In other words, raw data may be transmitted to the data intake and query system 110 and endpoint URLs 123 directly from the run of each production model, and data transfer into system 110 is streamlined by such parallelizing the execution of data transfer.

Further, the development environment 109 provides more interfacing parts, more connectivity, and more interfacing possibilities for customer defined containers allowing clients to pass external URLs 133 to the development environment 109, one or more web query 131 requests directly to the data intake and query system 110, and to maintain and monitor endpoint URLs 191 and search requests 193 through the data intake and query system 110 dashboard. The data intake and query system 110 may include a dashboard to provide container management control to view, monitor, or set interaction between the endpoint URLs 123, 191 and interactions between container environment 107 and the data intake and query system 110 within the machine learning architecture 100. Moreover, the data intake and query system 110 dashboard may provide granular control of container environment 107 and production models 102, for example, model surveying, as well as allowing users to containerize everything within the model.

The monitoring service 105 may be an application with one or more endpoints defined, that has one or more connections to container environment 107, through container connection 171 and model 102_1 . . . 102_N connection 173, to monitor and observe data flow and processing in container environment 107. The container connection 171 and model connection 173 enables full observability for the monitoring service 105 into the container environment 107, thus allowing the monitoring service 105 to monitor both application operations and infrastructure performance. For example, the monitoring service 105 may receive, via the container connection 171 and/or model connection 173, metrics indicating the performance of hardware, such as a CPU, GPU, memory, etc., of the container environment 107, metrics indicating ML cluster usage, and/or traces indicating calls and interactions between microservices operating in the container environment 107. The monitoring service 105 may further automatically instrument containers and all of the container endpoints with appropriate data collectors in order to collect metric and trace data from the container environment 107. The data intake and query system 110 includes numerous connection points to provide data and information to observability cloud 105 and container environment 107. The command and syntax of data intake and query system 110 may be configured to provide greater interoperability and compatibility between new and older machine learning systems and algorithms.

Figure 2:
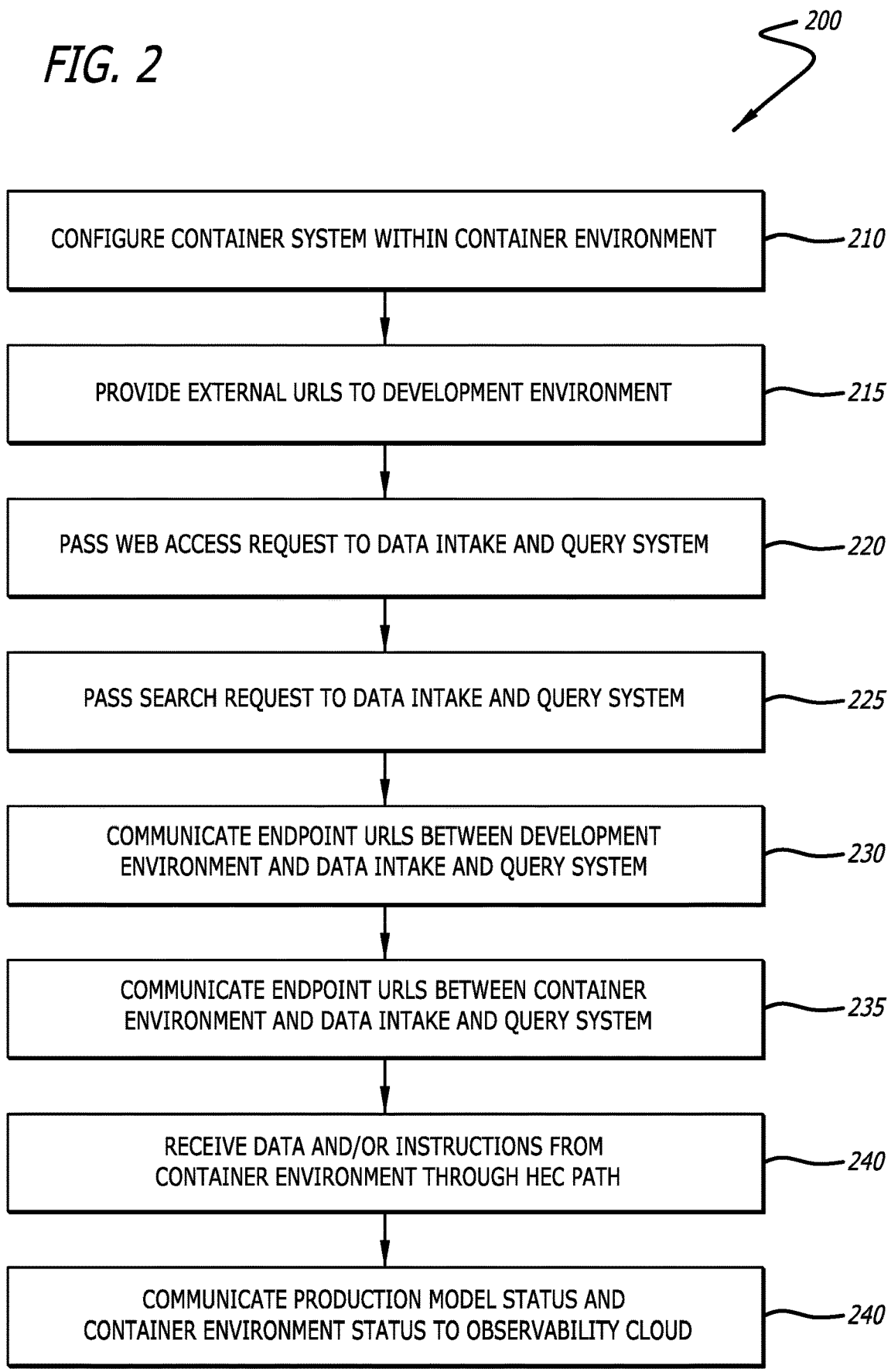
FIG. 2 is a flowchart depicting example operations of the machine learning architecture of FIG. 1, in accordance with an embodiment of the disclosure.

FIG. 2 is a flowchart depicting example operations of the machine learning architecture of FIG. 1 in accordance with an embodiment of the disclosure. The example process 200 can be implemented, for example, by a computing device that comprises a processor and a non-transitory computer-readable medium. The non-transitory computer readable medium can be storing instructions that, when executed by the processor, can cause the processor to perform the operations of the illustrated process 200. Alternatively or additionally, the process 200 can be implemented using a non-transitory computer-readable medium storing instructions that, when executed by one or more processors, case the one or more processors to perform the operations of the process 200 of FIG. 2.

The process 200 can configure the container system within the container environment (block 210). The process 200 can provide external URLs to the development environment (block 215). The process 200 can pass a web access request to the data intake and query system (block 220). The process 200 can pass a search request to the data intake and query system (block 225). The process 200 can communicate endpoint URLS between development environment and data intake and query system (block 230). The process 200 can communicate endpoint URLS between container environment and data intake and query system (block 235). The process 200 can receive data and/or instructions from the container environment through HEC path (block 240). The process 200 can communicate production model status and container environment status to observability cloud (block 245).

Figure 3:
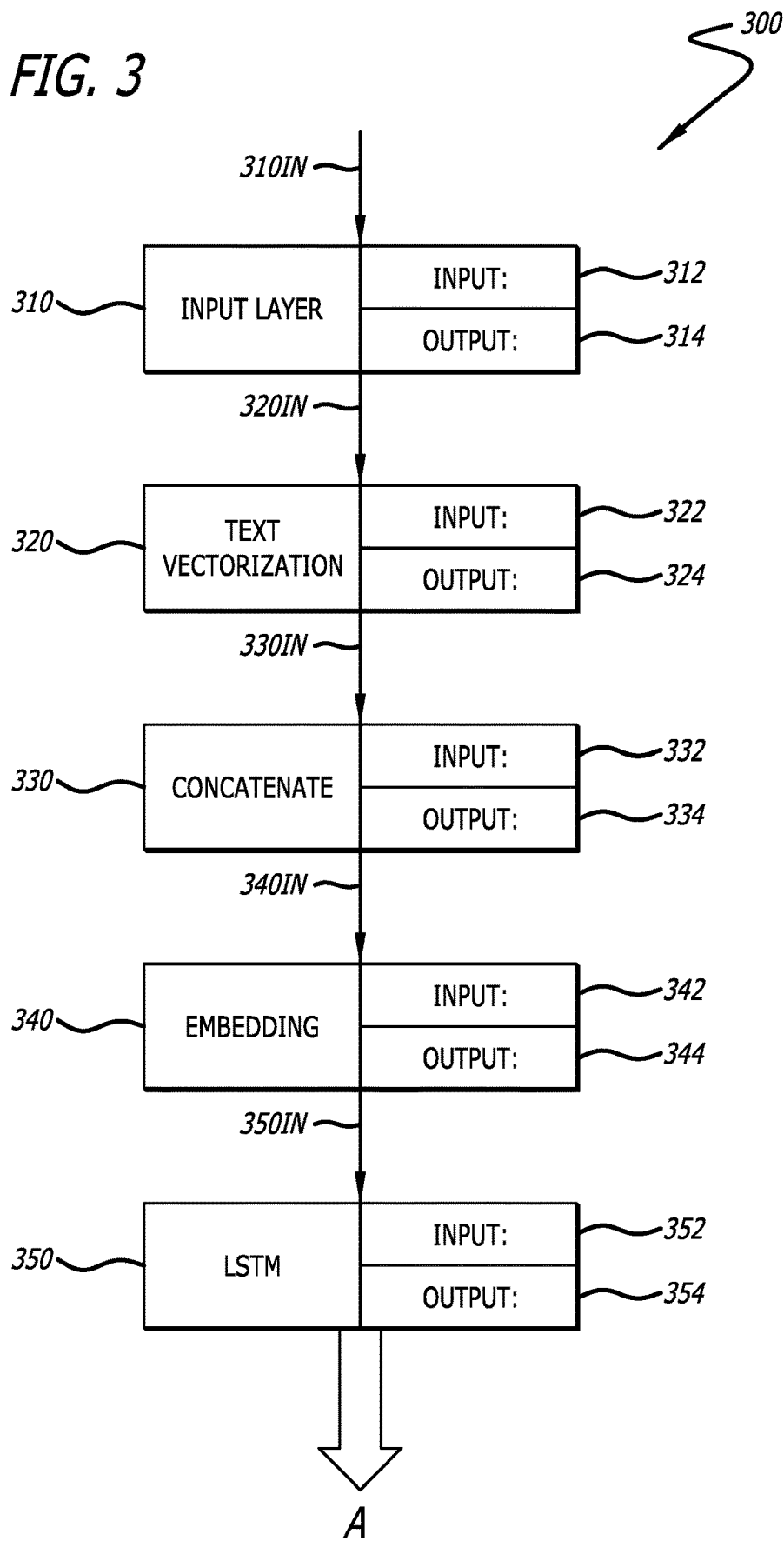
FIG. 3 is a block diagram of an example deep machine learning process for determining a domain generated by a domain generation algorithm, in accordance with an embodiment of the disclosure.

Referring to FIG. 3, a block diagram of an example deep machine learning process for determining a domain generation algorithm (DGA) in accordance with an embodiment of the disclosure. Some DGAs can appear as a string of randomly selected characters or concatenation of valid words. Other DGAs employ a seed element and a time-based element combined in an algorithm to create the domain name, and this "body" will be combined with one of the available top level domains (TLD) to create a seemingly innocuous and valid domain name. The example deep machine learning process 300 includes a plurality of layers for feature engineering an input, the input may be, for example, a domain name. The deep machine learning process 300 may include other layers not shown and may encompass, in part or in whole, the overall process for determining whether a domain name is from a domain generation algorithm. The example deep machine learning process 300 includes an input layer 310, a text vectorization layer 320, a concatenation layer 330, an embedding layer 340, and a long short-term memory (LSTM) layer 350.

In the example input layer 310, one or more pieces of data 310in may be provided as an input to the input layer 310. In some embodiments, the data 310in may include text or strings of text relating to a domain name. The inputted data 310in may be provided by at least one of a user or a host computing device, or stored on and/or executed from a storage system, storage device, one or more host or remote clients, or any combination thereof. The domain name is received by input layer 310 and pre-processed, for example, removed of unnecessary buffer data, outlier values, artifacts, or characters, out of range values, etc., into inputted data 312in input layer 310. The inputted data 312 for the domain name may comprise a string of characters that may be sorted into a list or table in input layer 310. Each inputted data 312 includes a single column or single feature. The input layer 310 may perform one or more data processing operations on inputted data 312 (e.g., the domain name), for example, the inputted data 312 (e.g., string) may further be parsed, formatted, or stripped of unnecessary data to provide an output 314. Thus, after processing data 310in in input layer 310, input layer 310 passes the output 314 to the text vectorization layer 320. The output 314 may be, for example, domain text formatted as needed for text vectorization layer 320 to perform additional processing operations. The output 314 is then passed as input 320in for text vectorization layer 320. In some embodiments, output 314 may be pre-processed as needed to prepare an input 320in for text vectorization layer 320.

In the example text vectorization layer 320 two operations may be performed on input 320in, tokenization and padding. In some embodiments, at least one of tokenization and padding is performed. In other embodiments, additional preprocessing operations may be performed. In the example process of tokenization, the input 320in (e.g., domain text) is split up by character and converted into an integer array 322, the integer array 322 contains indexes of each character. The tokenization process converts the string representations of the domain name to integer representations before the sequence model can be trained on the text. In some embodiments, the domain text may include upper and lower case characters, a-z, A-Z, numbers, 0-9, and a few special characters. In some embodiments, there are about 38 unique characters in the domain text and additional slots are considered for out of vocabulary words. In some embodiments, the input 320in may be further padded through a padding process and then the output 324 may be passed to concatenation layer 330.

In the example process of padding, the length of the input 320in (e.g., domain text) may be normalized to a fixed length. That is, the input lengths of domain names in input 320in are all set to a fixed length that captures all unique characters of the domain name. The padding process ensures all outputs when domains names are tokenized are of the same length. In some embodiments, these may be padded with 0s to fill in the desired length. In some embodiments, there are about 37 unique characters in the domain and additional slots are considered as padding. The output 324 is then passed as input 330in for concatenation layer 330. In some embodiments, output 324 may be pre-processed as needed to prepare an input 330in for concatenation layer 330.

In the example concatenation layer 330, the integer array 322 from input 330in is processed and prepared as a list of tensors all of the same shape as input 332. The concatenation layer 330 then returns a single tensor that is the concatenation of all inputs 332 as the output 334. The inputs and outputs are of the same dimensions. The output 334 is then passed as input 340in for embedding layer 340. In some embodiments, output 334 may be pre-processed as needed to prepare an input 340in for embedding layer 340.

In the example embedding layer 340, semantically similar text, characters, numbers or domain names are embedded into input 340in to form embedded input 342. The embedded input 342 is a dense numerical representation of the domain text expressed as a vector. In some embodiments, the embedded vectors are close to each other and are considered similar. Therefore, words that are found in similar contexts will have similar embeddings. Moreover, a plurality of embeddings may be further added to embedded input 342 to provide a dense representation output 344. The output 344 is then passed as input 350in for Long Short Term Memory (LSTM) layer 350. In some embodiments, output 344 may be pre-processed as needed to prepare an input 350in for Long Short Term Memory (LSTM) layer 350.

In the example LSTM layer 350, input 350in is received and pre-processed, for example, formatted, parsed, etc., as needed to input 352, then input 352 is passed to LSTM layer 350. The LSTM layer 350 comprises a recurrent neural network (RNN) with feedback connections that can process single data points (such as images) and entire sequences of data (such as speech or video). The LSTM layer 350 may include a plurality of LSTM layers suitable for learning long-term dependencies, each unit consists of gates, that controls the flow of information to subsequent units. The activation function is ReLU (Rectified Linear Unit). In some embodiments, the input shape may be 256 and output shape may be 256. There is also a dropout factor of 0.5 to regularize the model and prevent overfitting. The LSTM layer 350 may include one or more LSTM layers with 256 neurons/hidden units. The input 352 may be processed in one or more LSTM layers 350 to obtain output 354. The output 354 is passed as a deep learning input A. While in this example, an LSTM layer 350 is utilized to classify the domain names as either legitimate or non-legitimate (anomalous, malicious, erroneous, etc.,) DGA based on the embedded features from embedding layer 340. In some embodiments, other machine learning models can be trained or used. In still further embodiments, a plurality of machine learning models and embedding layers may be used to improve accuracy or provide for different security use cases, for example, monitoring internet traffic, advanced computer viruses or other cybersecurity threats.

Figure 4:
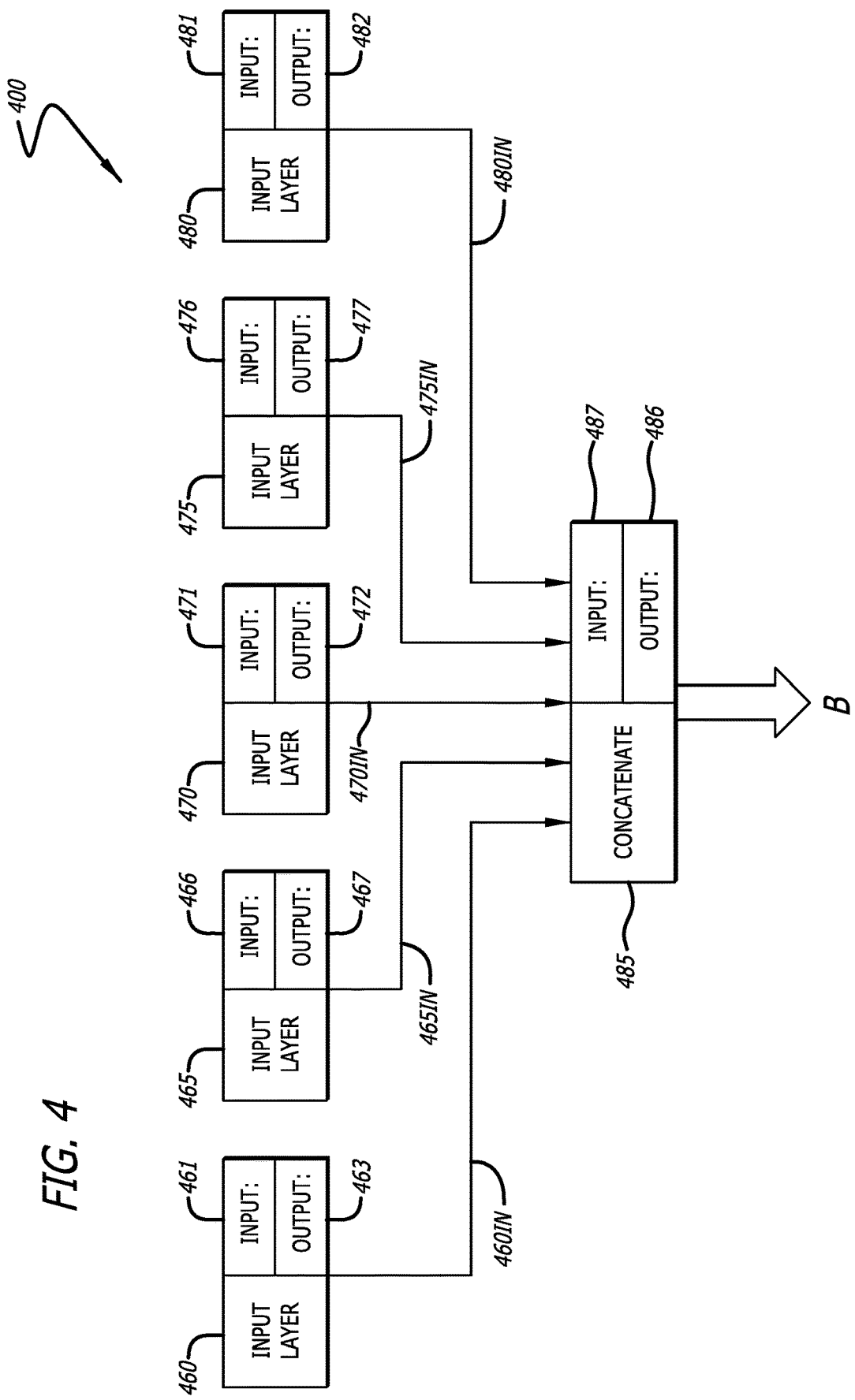
FIG. 4 is a block diagram of an example wide machine learning process for determining a domain generated by a domain generation algorithm, in accordance with an embodiment of the disclosure.

Referring to FIG. 4, a block diagram of an example wide machine learning process for determining a domain generation algorithm in accordance with an embodiment of the disclosure. The example wide machine learning process 400 includes a plurality of layers for learning about the frequent simultaneous occurrence of elements or characteristics and taking advantage of the correlation available in historical data for an input, the input may be, for example, a domain name. In the example wide machine learning process 400, additional custom features created by feature engineering from a domain name text. These additional features are called wide inputs, and the wide inputs are provided by wide input layers 460, 465, 470, 475, and 480. The example wide machine learning process 400 memorizes the rules and returns answers based on rules it has memorized (memorization of the model) providing benefits in understanding simple patterns between features, e.g., length, entropy, etc. The wide machine learning process 400 may include other layers not shown and may encompass, in part or in whole, the overall process for determining whether a domain name is from a domain generation algorithm. The example wide machine learning process 400 includes one or more wide inputs 460, 465, 470, 475, and 480, and a concatenation layer 485.

In the example wide input layer 460, one or more pieces of data may be provided as an input 461 to the wide input layer 460. In some embodiments, the one or more pieces of data may include text or strings of text relating to a domain name that may be provided by at least one of a user or a host computing device, or stored on and/or executed from a storage system, storage device, one or more host or remote clients, or any combination thereof. Thus, a domain name is received by wide input layer 460 and pre-processed, for example, removed of unnecessary buffer data, outlier values, artifacts, or characters, out of range values, etc., into inputted data 461in the wide input layer 460. The inputted data 461 for the domain name may comprise a string of characters that may be sorted into a list or table in wide input layer 460.

In wide input layer 470 the length of the domain name text is extracted from the inputted data 461 and added as a single column or single feature to the output 463. The output 463 is then passed as input 460in for concatenation layer 485. In some embodiments, output 463 may be pre-processed as needed to prepare an input 460in for concatenation layer 485.

In the example wide input layer 465, the one or more pieces of data may be further provided as an input 466 to the wide input layer 465. In some embodiments, the one or more pieces of data may include text or strings of text relating to a domain name that may be provided by at least one of a user or a host computing device, or stored on and/or executed from a storage system, storage device, one or more host or remote clients, or any combination thereof. Thus, a domain name is received by wide input layer 465 and pre-processed, for example, removed of unnecessary buffer data, outlier values, artifacts, or characters, out of range values, etc., into inputted data 466in the wide input layer 465. The inputted data 466 for the domain name may comprise a string of characters that may be sorted into a list or table in wide input layer 465.

In wide input layer 470 the Shannon Entropy of the domain name is calculated from the inputted data 466 and added as a single column or single feature to the output 467. The Shannon Entropy may be calculated as:

$$H(X) = -\frac{1}{\log \log N} \sum_{i} p_i \log \log p_i$$

where H is the entropy, X is a discrete random variable with i possible outcomes, and $p_i$ is probability of the outcome, N is the number of uniformly distributed elements. The output 467 is then passed as input 465in for concatenation layer 485. In some embodiments, output 467 may be pre-processed as needed to prepare an input 465in for concatenation layer 485.

In the example wide input layer 470, the one or more pieces of data may be further provided as an input 471 to the wide input layer 470. In some embodiments, the one or more pieces of data may include text or strings of text relating to a domain name that may be provided by at least one of a user or a host computing device, or stored on and/or executed from a storage system, storage device, one or more host or remote clients, or any combination thereof. Thus, a domain name is received by wide input layer 470 and pre-processed, for example, removed of unnecessary buffer data, outlier values, artifacts, or characters, out of range values, etc., into inputted data 471in the wide input layer 470. The inputted data 471 for the domain name may comprise a string of characters that may sorted into a list or table in wide input layer 470.

In wide input layer 470 the N-gram similarity score of a domain name with English dictionary words is calculated from the inputted data 471 and added as a single column or single feature to the output 472. In some embodiments, the N-gram similarity score may include the similarity score of how many 1-4 characters (as a sliding window) through domain text contains English dictionary words. The output 472 is then passed as input 470in for concatenation layer 485. In some embodiments, output 472 may be pre-processed as needed to prepare an input 470in for concatenation layer 485.

In the example wide input layer 475, the one or more pieces of data may be further provided as an input 476 to the wide input layer 475. In some embodiments, the one or more pieces of data may include text or strings of text relating to a domain name that may be provided by at least one of a user or a host computing device, or stored on and/or executed from a storage system, storage device, one or more host or remote clients, or any combination thereof. Thus, a domain name is received by wide input layer 475 and pre-processed, for example, removed of unnecessary buffer data, outlier values, artifacts, or characters, out of range values, etc., into inputted data 476in the wide input layer 475. The inputted data 476 for the domain name may comprise a string of characters that may sorted into a list or table in wide input layer 475.

In wide input layer 475 the N-gram similarity score of a domain name with non-DGA domains is calculated from the inputted data 476 and added as a single column or single feature to the output 477. In some embodiments, the N-gram similarity score may include the similarity score of how many 1-4 characters (as a sliding window) through domain text contains non-DGA domain word. The output 477 is then passed as input 475in for concatenation layer 485. In some embodiments, output 477 may be pre-processed as needed to prepare an input 475in for concatenation layer 485.

In the example wide input layer 480, the one or more pieces of data may be further provided as an input 481 to the wide input layer 480. In some embodiments, the one or more pieces of data may include text or strings of text relating to a domain name that may be provided by at least one of a user or a host computing device, or stored on and/or executed from a storage system, storage device, one or more host or remote clients, or any combination thereof. Thus, a domain name is received by wide input layer 480 and pre-processed, for example, removed of unnecessary buffer data, outlier values, artifacts, or characters, out of range values, etc., into inputted data 481in the wide input layer 480. The inputted data 481 for the domain name may comprise a string of characters that may sorted into a list or table in wide input layer 480.

In wide input layer 480 the Alexa Traffic Rank or a similar internet traffic ranking system is calculated from the inputted data 481 and added as a single column or single feature to the output 482. In some embodiments, it may be determined whether the domain name is present in the top 1 M dataset according to the Alexa Traffic Rank (contains non-DGA domains). The output 482 is then passed as input 480in for concatenation layer 485. In some embodiments, output 482 may be pre-processed as needed to prepare an input 480in for concatenation layer 485.

In the example concatenation layer 485, additional feature inputs 460in, 465in, 470in, 475in, 480in are received as an input 487. In some embodiments, input 487 may be pre-processed as needed for one or more feature inputs 460in, 465in, 470in, 475in, and 480in, the features are then concatenated as a single output 486 that is passed as a wide learning input B to concatenation layer 590.

In the example wide machine learning process 400 the N-gram scores will identify how similar are DGA domains with English words or non-DGA domains. These features will help in identifying simple patterns in the DGA domains. The deep machine learning process 300 analyzes the lexical patterns in domain names, looking at sequence of characters and the patterns and co-occurrences of symbols in the domain name text. In the wide machine learning process 400 additional features of interest can be accounted for. In some embodiments, other potential features that may be added include: vowel ratio, consonant ratio, digit ratio, number of hexadecimal symbols, and the like.

Figure 5:
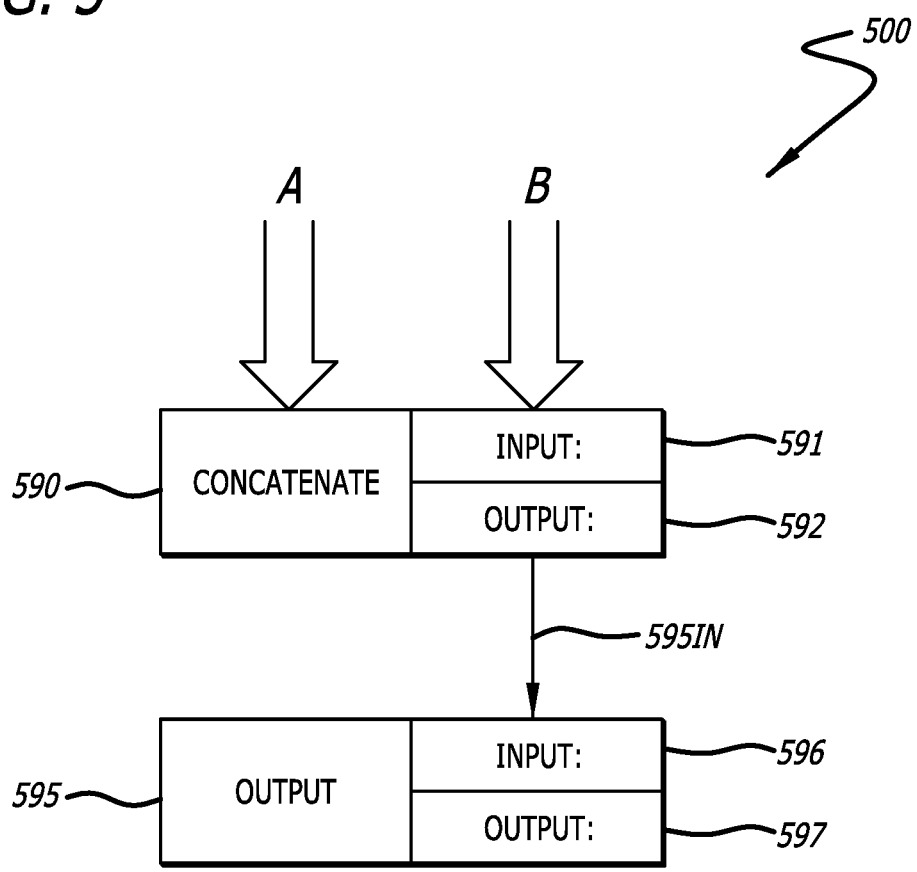
FIG. 5 is a block diagram of an example machine learning process for combining and processing the results of FIGS. 3-4, in accordance with an embodiment of the disclosure.

Referring to FIG. 5, a block diagram of an example machine learning process for combining and processing the results of FIGS. 1-2 in accordance with an embodiment of the disclosure. The deep learning input A from concatenation layer 350 and the wide learning input B from concatenation layer 485 are passed as inputs into concatenation layer 590. In the example concatenation layer 590, inputs A and B are passed to the concatenation layer 590 and may be pre-processed, for example, removed of unnecessary buffer data, artifacts, or characters, out of range values, etc., and prepared as input 591. Then input 591, that is inputs A and B, are concatenated as a single output 592. The output 592 is then passed as input 595 in for output layer 595. In some embodiments, output 592 may be pre-processed as needed to prepare an input 595 in for output layer 595.

In the example output layer 595, input 595 in is passed in as input 596. One or more transformations may be applied to input 596, for example, a non-linear transformation may be applied to input 596 to arrive at a final output 597. In some embodiments, the final output 597 may be a probability score that is the probability of the input belonging to a class, for example, legitimate domain or non-legitimate domain (e.g., malicious, anomalous, or erroneous) generated by a DGA. In some embodiments, a binary cross entropy is used as the loss function and training is stopped when the loss diff <0.001. In some embodiments, one or more activation functions may be used, and if used, the activation function may be a Sigmoid function that converts the output in the range of 0-1 with 0.5 as the threshold. If the probability score >0.5 then we label the input as DGA, otherwise Non-DGA. In some embodiments, one or more optimizer functions may be used, for example, a RMSProp function (Root Mean Squared Propagation) may be used.

The example feature vector created from the wide and deep learning architecture above in FIGS. 3-4 represents an example sequence of machine learning processes to better represent input data using one or more relevant features of the data. While the machine learning processes above are by no means exhaustive for determining DGA generated domain names, use of a custom set of features for representation of the data in one or more machine learning processes does produce better, more accurate results. Therefore, the various wide and deep layers of the machine learning architecture, for example, output units, hidden layers, dense embeddings, sparse features, and the like are selected in this disclosure with intent of improved detection of DGA-generated domain names as a lack of exactness would cause malicious domain names to go undetected leading to compromised systems and cyberthreats. Moreover, a sequential learning model (e.g., a sequential deep model) may be used to detect DGA-generated domains, for example, a deep learning model with deep path, where the one and only input to the model is the domain name. The deep path would then convert the domain name and tokenize (break down into unique characters) and create a vector in embedding space by passing the tokenized text into the embedding layer, then the dense layer with activation function sigmoid and outputs a value between 0-1. The higher the value the more likely it is a DGA-generated domain. However, adding custom features can aid in accurately classifying instances of DGA-generated domains using a wide path. This enhances the complexity of the model to understand the patterns in the domain text that would otherwise be missed in a deep path learning model enhancing accuracy and reducing false negatives (DGA-generated domain sample classified as non-DGA). Finally, the wide and deep learning architecture of the present disclosure provides a non-sequential machine learning network that allows the above deep and wide layers to be processed concurrently or in any order adding to the robustness of custom feature input in the wide machine learning model.

The wide and deep machine learning architecture includes one or more training phases and one or more prediction phases. In the training phase, a model is created based on a known huge dataset. In the prediction phase, the model is used to make predictions on unseen data. The input is a domain name, a sequence of characters.

Pattern representation of DGA- and non-DGA-generated domains are better learned from a sequence model, a deep learning approach where the model intrinsically creates features and is a part of the modeling. The dataset contains two columns: domain and is_dga. The domain column is a list of string values that consists of all legitimate and DGA-generated domains. Is_dga column is categorical column that indicates whether the domain name is legit or DGA-generated. Value 1 is a DGA-generated domain, and 0 is non-DGA-generated (legitimate) domain. The output from the tokenizer is a row vector for all domains in training dataset is fed into the deep neural network. An example dataset is seen in Table 1:

TABLE 1

| Domain | is_dga |
|---|---|
| greenmintasiangrill.com | 1 |
| derbrandman.de | 1 |
| benzinly.info | 1 |
| nestormedina.com | 1 |
| latterdayquotes.com | 1 |
| 1w1d7517s3hf7863h3.org | 0 |
| 9734hui389y3riug398y.com | 0 |
| rtwdf98oiuh34.net | 0 |
| ker83i4uh39oih9834.biz | 0 |
| kjhef8000923j9.net | 0 |

In the prediction phase, we attempt to predict if a domain is DGA or non-DGA. For example, a domain text of www.coffeeshop.com. First, the domain text is passed as a deep input, where it will go through tokenization, embedding, and LSTM layer. Then additional features such as len, entropy, n-gram score of English words (and/or other languages), etc., will be computed for the domain name. Then the outputs are concatenated as input to the final output layer. The output layer determines whether the DGA score is 0 or 1.

Figure 6:
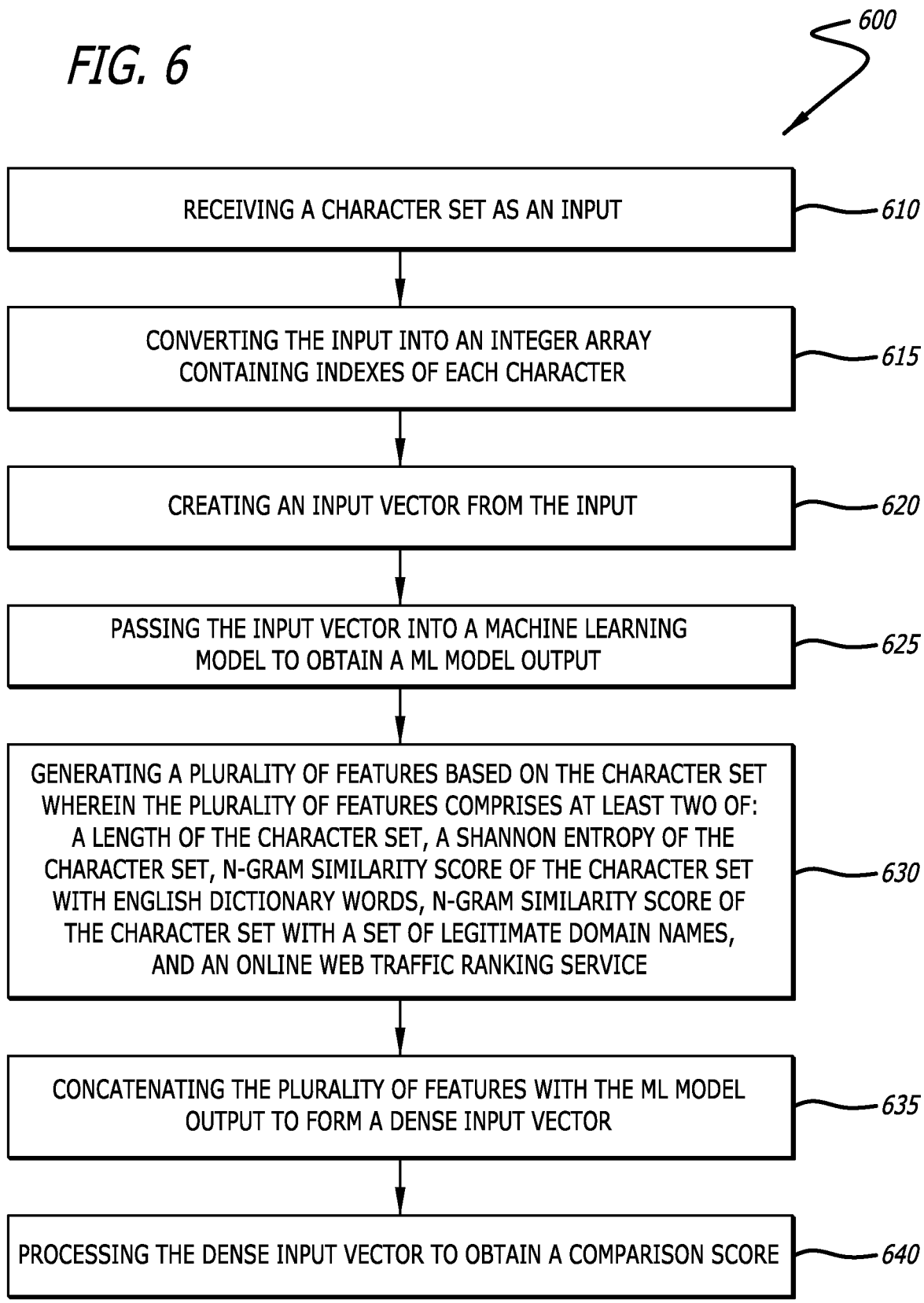
FIG. 6 is a flowchart depicting an example machine learning process for determining a domain generated by a domain generation algorithm, in accordance with an embodiment of the disclosure.

Referring to FIG. 6, a flowchart illustrating an example machine learning process 600 for determining a DGA-generated domain in accordance with an embodiment of the disclosure. The example process 600 can be implemented, for example, by a computing device that comprises a processor and a non-transitory computer-readable medium. The non-transitory computer readable medium can be storing instructions that, when executed by the processor, can cause the processor to perform the operations of the illustrated process 600. Alternatively or additionally, the process 600 can be implemented using a non-transitory computer-readable medium storing instructions that, when executed by one or more processors, cause the one or more processors to perform the operations of the process 600 of FIG. 6.

The process 600 can receive a character set as an input (block 610). The process 600 can convert the input into an integer array containing indexes of each character (block 615). The process 600 can create an input vector from the input, wherein the input vector is a dense numerical representation of the character set (block 620). The process 600 can pass the input vector into a machine learning model resulting in a ML model output (block 625). The process 600 can generate a plurality of features based on the character set (block 630). In some implementations, the plurality of features includes obtaining from the character set, at least two of: a length of the character set, a Shannon Entropy of the character set, n-gram similarity score of the character set with English dictionary words, n-gram similarity score of the character set with a set of legitimate domains (i.e., domains not generated by a domain generation algorithm (DGA)), and/or an online web traffic ranking service. The process 600 includes concatenating the plurality of features ("wide model output") with the ML model output ("deep model output") to form a dense input vector (block 635). In some implementations, the wide model output may be a vector having a dimension of (5) and the deep model output may be a vector having a dimension of (256) where the concatenation results in a dense input vector having a dimension of (251). The process 600 can analyze the dense input vector to obtain a comparison score, e.g., between 0-1 indicating whether the character set is a DGA-generated domain (block 640). In some implementations, following concatenation of the plurality of features with the ML model output, a subsequent layer (a final layer, or an output layer) accepts input (the dense input vector) and applies a non-linear transformation resulting in a determination of the final output, which may be a probability score indicative of the probability that the character set representing the domain name is a domain generated by a DGA. In some examples, Binary Cross Entropy is used as the loss function and training is stopped when the loss diff <0.001. The activation function used may be the Sigmoid function that converts the output in the range of 0-1 with 0.5 as the threshold. In some examples, when the probability score is greater 0.5, the domain name received as input is labeled as being generated by a DGA. When the probability score is less than or equal to 0.5, the domain name received as input is labeled as not being generated by a DGA. In some examples, Root Mean Squared Propagation is used an optimizer.

Figure 7:
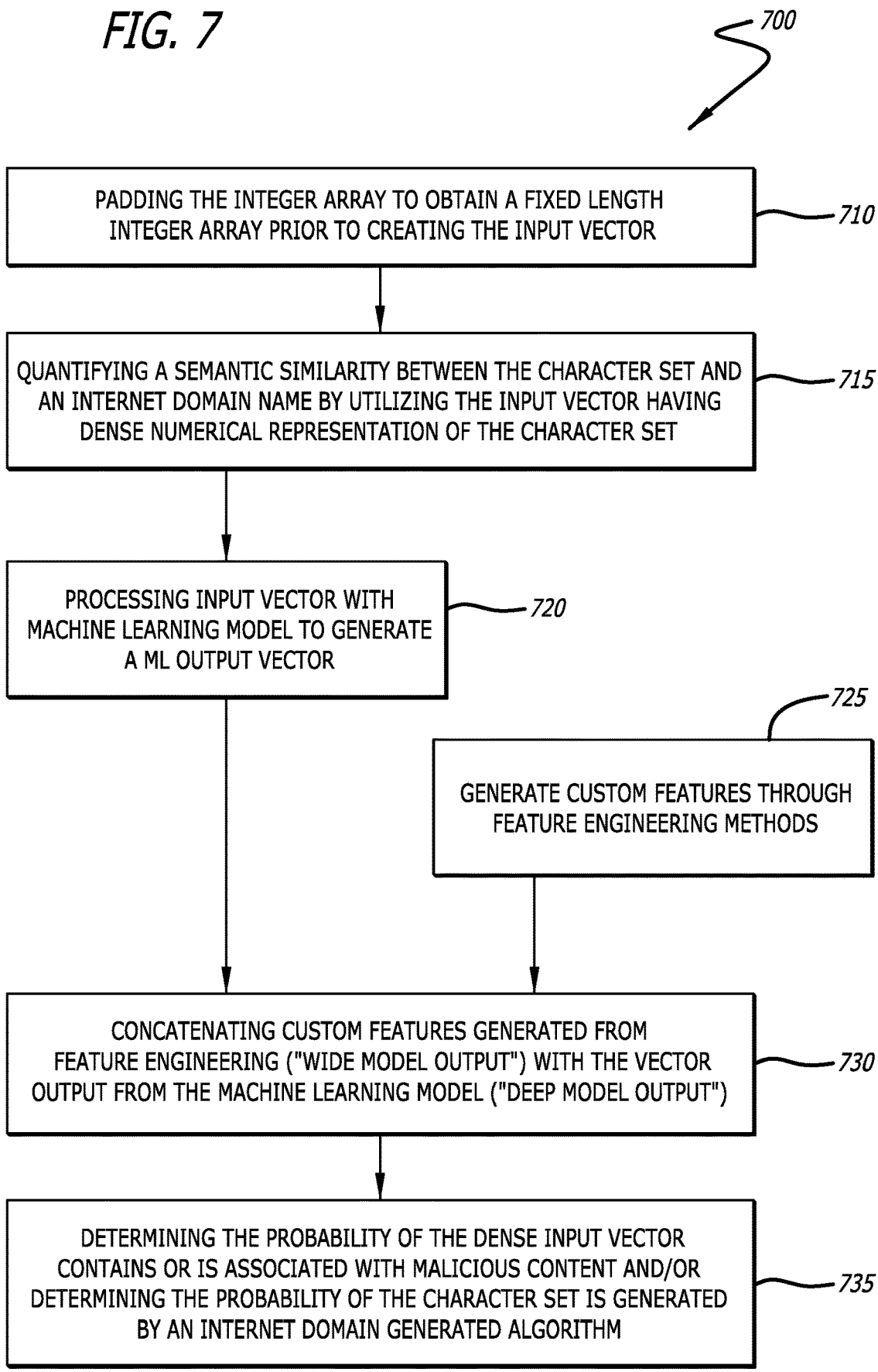
FIG. 7 is a flowchart depicting an example machine learning process for determining a domain generated by a domain generation algorithm, in accordance with an embodiment of the disclosure.

Referring to FIG. 7, a flowchart illustrating an example machine learning process 700 for determining a DGA-generated domain in accordance with an embodiment of the disclosure. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, cause the one or more processors to perform the operations of the process 700 of FIG. 7.

The process 700 can pad the integer array to obtain a fixed length integer array prior to creating the input vector (block 710). The process 700 can quantify a semantic similarity between the character set and an internet domain name by utilizing the input vector having dense numerical representation of the character set (block 715). The input vector is then processed by a machine learning model (e.g., a long short-term memory network (LSTM) neural network model) resulting in generation of a ML output vector (block 720). Additionally, the process 700 may include operations of generating custom features through one or more feature engineering methods (block 725). As noted above, such custom features may be generated by determining any of the following with respect to the character set representing the domain name: a length of the character set, a Shannon Entropy of the character set, n-gram similarity score of the character set with a predetermined dictionary of words, n-gram similarity score of the character set with a set of legitimate domains, etc. Further, the process 700 includes an operation of concatenating the custom features generated using feature engineering methods with the output from the machine learning model resulting in generation of a dense input vector (block 730). Finally, the probability of the dense input vector includes or represents malicious content and/or was generated by an internet domain generation algorithm is determined (block 735).

In certain implementations, the above-disclosure includes (i) a computer-implemented method, (ii) a computing device including a processor and a non-transitory computer-readable medium having stored thereon instructions that, when executed by the processor, cause the processor to perform operations, and (iii) a non-transitory computer-readable medium having stored thereon instructions that, when executed by one or more processors, cause the one or more processor to perform operations. Further in certain detailed implementations, the operations of the method and those performed through execution of a processor include: receiving a character set as an input; converting the input into an integer array containing indexes of characters within the character set; creating an input vector from the integer array, wherein the input vector is a dense numerical representation of the character set; passing the input vector into a machine learning model; generating a plurality of features based on the character set; wherein the plurality of features, obtained from the character set, comprises at least two of: a length of the character set, a Shannon Entropy of the character set, n-gram similarity score of the character set with a predetermined dictionary of words, n-gram similarity score of the character set with a set of legitimate domains (i.e., domains not generated by a domain generation algorithm (DGA), or an online web traffic ranking service; concatenating the plurality of features to the input vector to form a dense input vector; and processing the dense input vector to obtain a comparison score.

In some examples, creating an input vector from the input further comprises padding the integer array to obtain a fixed length integer array. In other examples, creating the input vector having dense numerical representation of the character set includes quantifying a semantic similarity between the character set and an internet domain name. In some implementations, the machine learning model is selected from a group consisting of: a recurrent neural network (RNN), a long short-term memory network (LSTM), a feedforward neural network (FNN), and a convolutional neural network (CNN). In some examples, the comparison score determines the probability of the dense input vector containing or being associated with a DGA generated domain. In certain implementations, the comparison score determines the probability of the character set being generated by an internet domain generation algorithm. In some examples, the input vector outputted from the machine learning model is concatenated with custom features generated from one or more internet domain names.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 8:
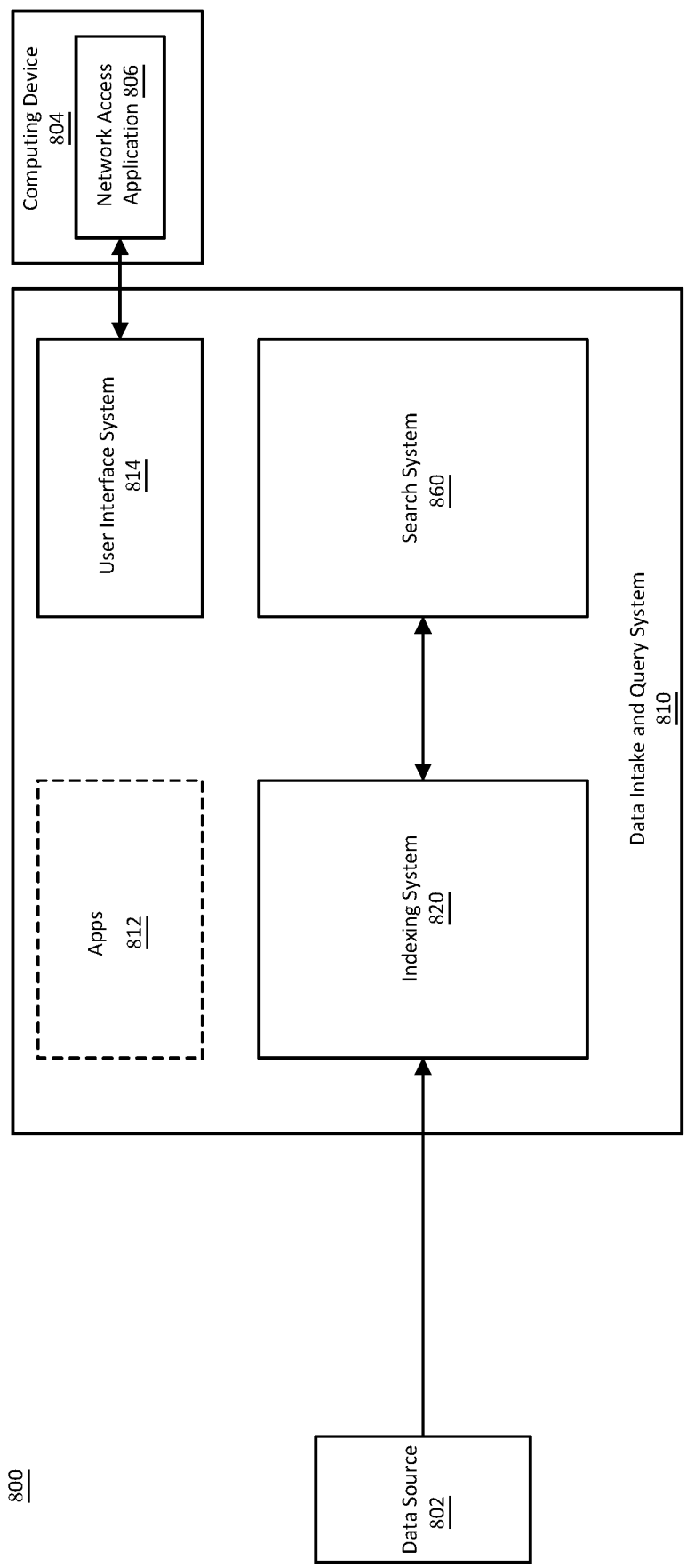
FIG. 8 is a block diagram illustrating an example computing environment that includes a data intake and query system for determining a domain generated by a domain generation algorithm, in accordance with an embodiment of the disclosure.

FIG. 8 is a block diagram illustrating an example computing environment 800 that includes a data intake and query system 810. The data intake and query system 810 obtains data from a data source 802 in the computing environment 800, and ingests the data using an indexing system 820. A search system 860 of the data intake and query system 810 enables users to navigate the indexed data. Though drawn with separate boxes in FIG. 8, in some implementations the indexing system 820 and the search system 860 can have overlapping components. A computing device 804, running a network access application 806, can communicate with the data intake and query system 810 through a user interface system 814 of the data intake and query system 810. Using the computing device 804, a user can perform various operations with respect to the data intake and query system 810, such as administration of the data intake and query system 810, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 810 can further optionally include apps 812 that extend the search, analytics, and/or visualization capabilities of the data intake and query system 810.

The data intake and query system 810 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 810 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 810 can be executed on a single computing device, or execution of the program code can be distributed over multiple computing devices. For example, the program code can include instructions for both indexing and search components (which may be part of the indexing system 820 and/or the search system 860, respectively), which can be executed on a computing device that also provides the data source 802. As another example, the program code can be executed on one computing device, where execution of the program code provides both indexing and search components, while another copy of the program code executes on a second computing device that provides the data source 802. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 802 of the computing environment 800 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 802 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 820 obtains machine date from the data source 802 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 820 does not require prior knowledge of the structure of incoming data (e.g., the indexing system 820 does not need to be provided with a schema describing the data). Additionally, the indexing system 820 retains a copy of the data as it was received by the indexing system 820 such that the original data is always available for searching (e.g., no data is discarded, though, in some examples, the indexing system 820 can be configured to do so).

The search system 860 searches the data stored by the indexing 820 system. As discussed in greater detail below, the search system 860 enables users associated with the computing environment 800 (and possibly also other users) to navigate the data, generate reports, and visualize search results in "dashboards" output using a graphical interface. Using the facilities of the search system 860, users can obtain insights about the data, such as retrieving events from an index, calculating metrics, searching for specific conditions within a rolling time window, identifying patterns in the data, and predicting future trends, among other examples. To achieve greater efficiency, the search system 860 can apply map-reduce methods to parallelize searching of large volumes of data. Additionally, because the original data is available, the search system 860 can apply a schema to the data at search time. This allows different structures to be applied to the same data, or for the structure to be modified if or when the content of the data changes. Application of a schema at search time may be referred to herein as a late-binding schema technique.

The user interface system 814 provides mechanisms through which users associated with the computing environment 800 (and possibly others) can interact with the data intake and query system 810. These interactions can include configuration, administration, and management of the indexing system 820, initiation and/or scheduling of queries that are to be processed by the search system 860, receipt or reporting of search results, and/or visualization of search results. The user interface system 814 can include, for example, facilities to provide a command line interface or a web-based interface.

Users can access the user interface system 814 using a computing device 804 that communicates with data intake and query system 810, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 800. For example, a person can log in as a particular user and, using the user's digital information, can access the data intake and query system 810. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 804 can provide a human-machine interface through which a person can have a digital presence in the computing environment 800 in the form of a user. The computing device 804 is an electronic device having one or more processors and a memory capable of storing instructions for execution by the one or more processors. The computing device 804 can further include input/output (I/O) hardware and a network interface. Applications executed by the computing device 804 can include a network access application 806, such as a web browser, which can use a network interface of the client computing device 804 to communicate, over a network, with the user interface system 814 of the data intake and query system 810. The user interface system 814 can use the network access application 806 to generate user interfaces that enable a user to interact with the data intake and query system 810. A web browser is one example of a network access application. A shell tool can also be used as a network access application. In some examples, the data intake and query system 810 is an application executing on the computing device 806. In such examples, the network access application 806 can access the user interface system 814 without going over a network.

The data intake and query system 810 can optionally include apps 812. An app of the data intake and query system 810 is a collection of configurations, knowledge objects (a user-defined entity that enriches the data in the data intake and query system 810), views, and dashboards that may provide additional functionality, different techniques for searching the data, and/or additional insights into the data. The data intake and query system 810 can execute multiple applications simultaneously. Example applications include an information technology service intelligence application, which can monitor and analyze the performance and behavior of the computing environment 800, and an enterprise security application, which can include content and searches to assist security analysts in diagnosing and acting on anomalous or malicious behavior in the computing environment 800.

Though FIG. 8 illustrates only one data source, in practical implementations, the computing environment 800 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 800, the data intake and query system 810 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 800 can include on-prem and cloud-based computing resources, or only cloud-based resources. For example, an entity may have on-prem computing devices and a private cloud. In this example, the entity operates the data intake and query system 810 and can choose to execute the data intake and query system 810 on an on-prem computing device or in the cloud. In another example, a provider entity operates the data intake and query system 810 in a public cloud and provides the functionality of the data intake and query system 810 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 810. In some implementations, the entity providing the data intake and query system 810 is itself subscribing to the cloud services of a cloud service provider. As an example, a first entity provides computing resources under a public cloud service model, a second entity subscribes to the cloud services of the first provider entity and uses the cloud computing resources to operate the data intake and query system 810, and a third entity can subscribe to the services of the second provider entity in order to use the functionality of the data intake and query system 810. In this example, the data sources are associated with the third entity, users accessing the data intake and query system 810 are associated with the third entity, and the analytics and insights provided by the data intake and query system 810 are for purposes of the third entity's operations.

Figure 9:
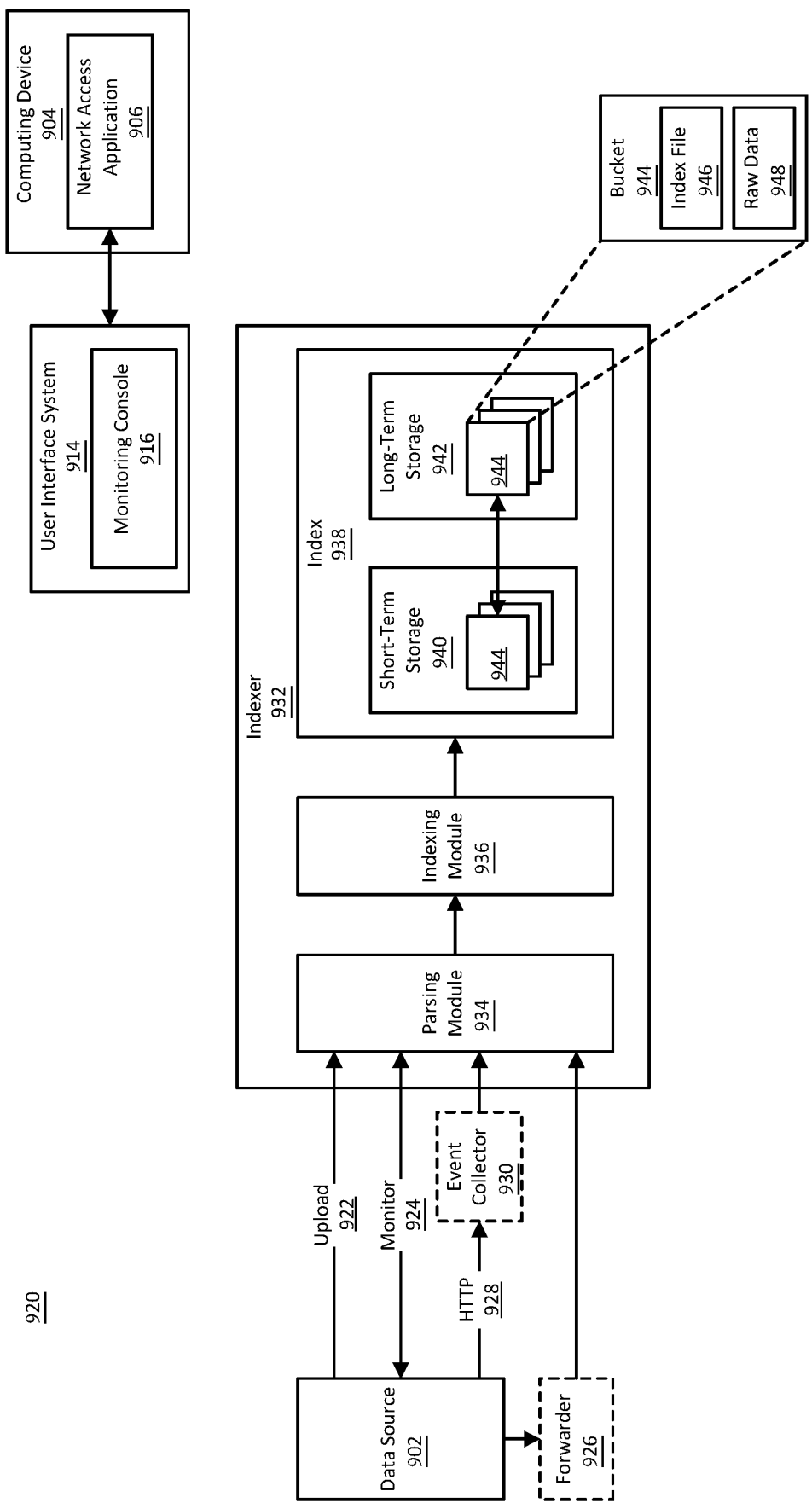
FIG. 9 is a block diagram illustrating in greater detail an example of an indexing system of a data intake and query system for determining a domain generated by a domain generation algorithm, in accordance with an embodiment of the disclosure.

FIG. 9 is a block diagram illustrating in greater detail an example of an indexing system 920 of a data intake and query system, such as the data intake and query system 810 of FIG. 8. The indexing system 920 of FIG. 9 uses various methods to obtain machine data from a data source 902 and stores the data in an index 938 of an indexer 932. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 920 enables the data intake and query system to obtain the machine data produced by the data source 902 and to store the data for searching and retrieval.

Users can administer the operations of the indexing system 920 using a computing device 904 that can access the indexing system 920 through a user interface system 914 of the data intake and query system. For example, the computing device 904 can be executing a network access application 906, such as a web browser or a terminal, through which a user can access a monitoring console 916 provided by the user interface system 914. The monitoring console 916 can enable operations such as: identifying the data source 902 for data ingestion; configuring the indexer 932 to index the data from the data source 932; configuring a data ingestion method; configuring, deploying, and managing clusters of indexers; and viewing the topology and performance of a deployment of the data intake and query system, among other operations. The operations performed by the indexing system 920 may be referred to as "index time" operations, which are distinct from "search time" operations that are discussed further below.

The indexer 932, which may be referred to herein as a data indexing component, coordinates and performs most of the index time operations. The indexer 932 can be implemented using program code that can be executed on a computing device. The program code for the indexer 932 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 932. In some implementations, the indexer 932 executes on the computing device 904 through which a user can access the indexing system 920. In some implementations, the indexer 932 executes on a different computing device than the illustrated computing device 904.

The indexer 932 may be executing on the computing device that also provides the data source 902 or may be executing on a different computing device. In implementations wherein the indexer 932 is on the same computing device as the data source 902, the data produced by the data source 902 may be referred to as "local data." In other implementations the data source 902 is a component of a first computing device and the indexer 932 executes on a second computing device that is different from the first computing device. In these implementations, the data produced by the data source 902 may be referred to as "remote data." In some implementations, the first computing device is "on-prem" and in some implementations the first computing device is "in the cloud." In some implementations, the indexer 932 executes on a computing device in the cloud and the operations of the indexer 932 are provided as a service to entities that subscribe to the services provided by the data intake and query system.

For a given data produced by the data source 902, the indexing system 920 can be configured to use one of several methods to ingest the data into the indexer 932. These methods include upload 922, monitor 924, using a forwarder 926, or using HyperText Transfer Protocol (HTTP 928) and an event collector 930. These and other methods for data ingestion may be referred to as "getting data in" (GDI) methods.

Using the upload 922 method, a user can specify a file for uploading into the indexer 932. For example, the monitoring console 916 can include commands or an interface through which the user can specify where the file is located (e.g., on which computing device and/or in which directory of a file system) and the name of the file. The file may be located at the data source 902 or maybe on the computing device where the indexer 932 is executing. Once uploading is initiated, the indexer 932 processes the file, as discussed further below. Uploading is a manual process and occurs when instigated by a user. For automated data ingestion, the other ingestion methods are used.

The monitor 924 method enables the indexing system 902 to monitor the data source 902 and continuously or periodically obtain data produced by the data source 902 for ingestion by the indexer 932. For example, using the monitoring console 916, a user can specify a file or directory for monitoring. In this example, the indexing system 902 can execute a monitoring process that detects whenever the file or directory is modified and causes the file or directory contents to be sent to the indexer 932. As another example, a user can specify a network port for monitoring. In this example, a monitoring process can capture data received at or transmitting from the network port and cause the data to be sent to the indexer 932. In various examples, monitoring can also be configured for data sources such as operating system event logs, performance data generated by an operating system, operating system registries, operating system directory services, and other data sources.

Monitoring is available when the data source 902 is local to the indexer 932 (e.g., the data source 902 is on the computing device where the indexer 932 is executing). Other data ingestion methods, including forwarding and the event collector 930, can be used for either local or remote data sources.

A forwarder 926, which may be referred to herein as a data forwarding component, is a software process that sends data from the data source 902 to the indexer 932. The forwarder 926 can be implemented using program code that can be executed on the computer device that provides the data source 902. A user launches the program code for the forwarder 926 on the computing device that provides the data source 902. The user can further configure the forwarder 926, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 926 can provide various capabilities. For example, the forwarder 926 can send the data unprocessed or can perform minimal processing on the data before sending the data to the indexer 932. Minimal processing can include, for example, adding metadata tags to the data to identify a source, source type, and/or host, among other information, dividing the data into blocks, and/or applying a timestamp to the data. In some implementations, the forwarder 926 can break the data into individual events (event generation is discussed further below) and send the events to a receiver. Other operations that the forwarder 926 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 930 provides an alternate method for obtaining data from the data source 902. The event collector 930 enables data and application events to be sent to the indexer 932 using HTTP 928. The event collector 930 can be implemented using program code that can be executing on a computing device. The program code may be a component of the data intake and query system or can be a standalone component that can be executed independently of the data intake and query system and operates in cooperation with the data intake and query system.

To use the event collector 930, a user can, for example using the monitoring console 916 or a similar interface provided by the user interface system 914, enable the event collector 930 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 902 as an alternative method to using a username and password for authentication.

To send data to the event collector 930, the data source 902 is supplied with a token and can then send HTTP 928 requests to the event collector 930. To send HTTP 928 requests, the data source 902 can be configured to use an HTTP client and/or to use logging libraries such as those supplied by Java, JavaScript, and .NET libraries. An HTTP client enables the data source 902 to send data to the event collector 930 by supplying the data, and a Uniform Resource Identifier (URI) for the event collector 930 to the HTTP client. The HTTP client then handles establishing a connection with the event collector 930, transmitting a request containing the data, closing the connection, and receiving an acknowledgment if the event collector 930 sends one. Logging libraries enable HTTP 928 requests to the event collector 930 to be generated directly by the data source. For example, an application can include or link a logging library, and through functionality provided by the logging library manage establishing a connection with the event collector 930, transmitting a request, and receiving an acknowledgement.

An HTTP 928 request to the event collector 930 can contain a token, a channel identifier, event metadata, and/or event data. The token authenticates the request with the event collector 930. The channel identifier, if available in the indexing system 920, enables the event collector 930 to segregate and keep separate data from different data sources. The event metadata can include one or more key-value pairs that describe the data source 902 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 930 extracts events from HTTP 928 requests and sends the events to the indexer 932. The event collector 930 can further be configured to send events to one or more indexers. Extracting the events can include associating any metadata in a request with the event or events included in the request. In these implementations, event generation by the indexer 932 (discussed further below) is bypassed, and the indexer 932 moves the events directly to indexing. In some implementations, the event collector 930 extracts event data from a request and outputs the event data to the indexer 932, and the indexer generates events from the event data. In some implementations, the event collector 930 sends an acknowledgement message to the data source 902 to indicate that the event collector 930 has received a particular request form the data source 902, and/or to indicate to the data source 902 that events in the request have been added to an index.

The indexer 932 ingests incoming data and transforms the data into searchable knowledge in the form of events. In the data intake and query system, an event is a single piece of data that represents activity of the component represented in FIG. 9 by the data source 902. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 932 can include a parsing module 934 and an indexing module 936 for generating and storing the events. The parsing module 934 and indexing module 936 can be modular and pipelined, such that one component can be operating on a first set of data while the second component is simultaneously operating on a second sent of data. Additionally, the indexer 932 may at any time have multiple instances of the parsing module 934 and indexing module 936, with each set of instances configured to simultaneously operate on data from the same data source or from different data sources. The parsing module 934 and indexing module 936 are illustrated in FIG. 9 to facilitate discussion, with the understanding that implementations with other components are possible to achieve the same functionality.

The parsing module 934 determines information about incoming event data, where the information can be used to identify events within the event data. For example, the parsing module 934 can associate a source type with the event data. A source type identifies the data source 902 and describes a possible data structure of event data produced by the data source 902. For example, the source type can indicate which fields to expect in events generated at the data source 902 and the keys for the values in the fields, and possibly other information such as sizes of fields, an order of the fields, a field separator, and so on. The source type of the data source 902 can be specified when the data source 902 is configured as a source of event data. Alternatively, the parsing module 934 can determine the source type from the event data, for example from an event field in the event data or using machine learning techniques applied to the event data.

Other information that the parsing module 934 can determine includes timestamps. In some cases, an event includes a timestamp as a field, and the timestamp indicates a point in time when the action represented by the event occurred or was recorded by the data source 902 as event data. In these cases, the parsing module 934 may be able to determine from the source type associated with the event data that the timestamps can be extracted from the events themselves. In some cases, an event does not include a timestamp and the parsing module 934 determines a timestamp for the event, for example from a name associated with the event data from the data source 902 (e.g., a file name when the event data is in the form of a file) or a time associated with the event data (e.g., a file modification time). As another example, when the parsing module 934 is not able to determine a timestamp from the event data, the parsing module 934 may use the time at which it is indexing the event data. As another example, the parsing module 934 can use a user-configured rule to determine the timestamps to associate with events.

The parsing module 934 can further determine event boundaries. In some cases, a single line (e.g., a sequence of characters ending with a line termination) in event data represents one event while in other cases, a single line represents multiple events. In yet other cases, one event may span multiple lines within the event data. The parsing module 934 may be able to determine event boundaries from the source type associated with the event data, for example from a data structure indicated by the source type. In some implementations, a user can configure rules the parsing module 934 can use to identify event boundaries.

The parsing module 934 can further extract data from events and possibly also perform transformations on the events. For example, the parsing module 934 can extract a set of fields (key-value pairs) for each event, such as a host or hostname, source or source name, and/or source type. The parsing module 934 may extract certain fields by default or based on a user configuration. Alternatively or additionally, the parsing module 934 may add fields to events, such as a source type or a user-configured field. As another example of a transformation, the parsing module 934 can anonymize fields in events to mask sensitive information, such as social security numbers or account numbers. Anonymizing fields can include changing or replacing values of specific fields. The parsing component 934 can further perform user-configured transformations.

The parsing module 934 outputs the results of processing incoming event data to the indexing module 936, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 932 can be configured to identify searchable segments that are parts of fields, searchable segments that are entire fields, or both. The parsing module 934 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 946, to find event data that matches a search query. In some implementations, segmentation can alternatively be performed by the forwarder 926. Segmentation can also be disabled, in which case the indexer 932 will not build a lexicon for the event data. When segmentation is disabled, the search system searches the event data directly.

Building index data structures generates the index 938. The index 938 is a storage data structure on a storage device (e.g., a disk drive or other physical device for storing digital data). The storage device may be a component of the computing device on which the indexer 932 is operating (referred to herein as local storage) or may be a component of a different computing device (referred to herein as remote storage) that the indexer 938 has access to over a network. The indexer 932 can manage more than one index and can manage indexes of different types. For example, the indexer 932 can manage event indexes, which impose minimal structure on stored data and can accommodate any type of data. As another example, the indexer 932 can manage metrics indexes, which use a highly structured format to handle the higher volume and lower latency demands associated with metrics data.

The indexing module 936 organizes files in the index 938 in directories referred to as buckets. The files in a bucket 944 can include raw data files, index files, and possibly also other metadata files. As used herein, "raw data" means data as when the data was produced by the data source 902, without alteration to the format or content. As noted previously, the parsing component 934 may add fields to event data and/or perform transformations on fields in the event data. Event data that has been altered in this way is referred to herein as enriched data. A raw data file 948 can include enriched data, in addition to or instead of raw data. The raw data file 948 may be compressed to reduce disk usage. An index file 946, which may also be referred to herein as a "time-series index" or tsidx file, contains metadata that the indexer 932 can use to search a corresponding raw data file 948. As noted above, the metadata in the index file 946 includes a lexicon of the event data, which associates each unique keyword in the event data with a reference to the location of event data within the raw data file 948. The keyword data in the index file 946 may also be referred to as an inverted index. In various implementations, the data intake and query system can use index files for other purposes, such as to store data summarizations that can be used to accelerate searches.

A bucket 944 includes event data for a particular range of time. The indexing module 936 arranges buckets in the index 938 according to the age of the buckets, such that buckets for more recent ranges of time are stored in short-term storage 940 and buckets for less recent ranges of time are stored in long-term storage 942. Short-term storage 940 may be faster to access while long-term storage 942 may be slower to access. Buckets may be moves from short-term storage 940 to long-term storage 942 according to a configurable data retention policy, which can indicate at what point in time a bucket is old enough to be moved.

A bucket's location in short-term storage 940 or long-term storage 942 can also be indicated by the bucket's status. As an example, a bucket's status can be "hot," "warm," "cold," "frozen," or "thawed." In this example, hot bucket is one to which the indexer 932 is writing data and the bucket becomes a warm bucket when the index 932 stops writing data to it. In this example, both hot and warm buckets reside in short-term storage 940. Continuing this example, when a warm bucket is moved to long-term storage 942, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 920 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 920 through the monitoring console 916 provided by the user interface system 914. Using the monitoring console 916, the user can configure and monitor an index cluster, and see information such as disk usage by an index, volume usage by an indexer, index and volume size over time, data age, statistics for bucket types, and bucket settings, among other information.

Figure 10:
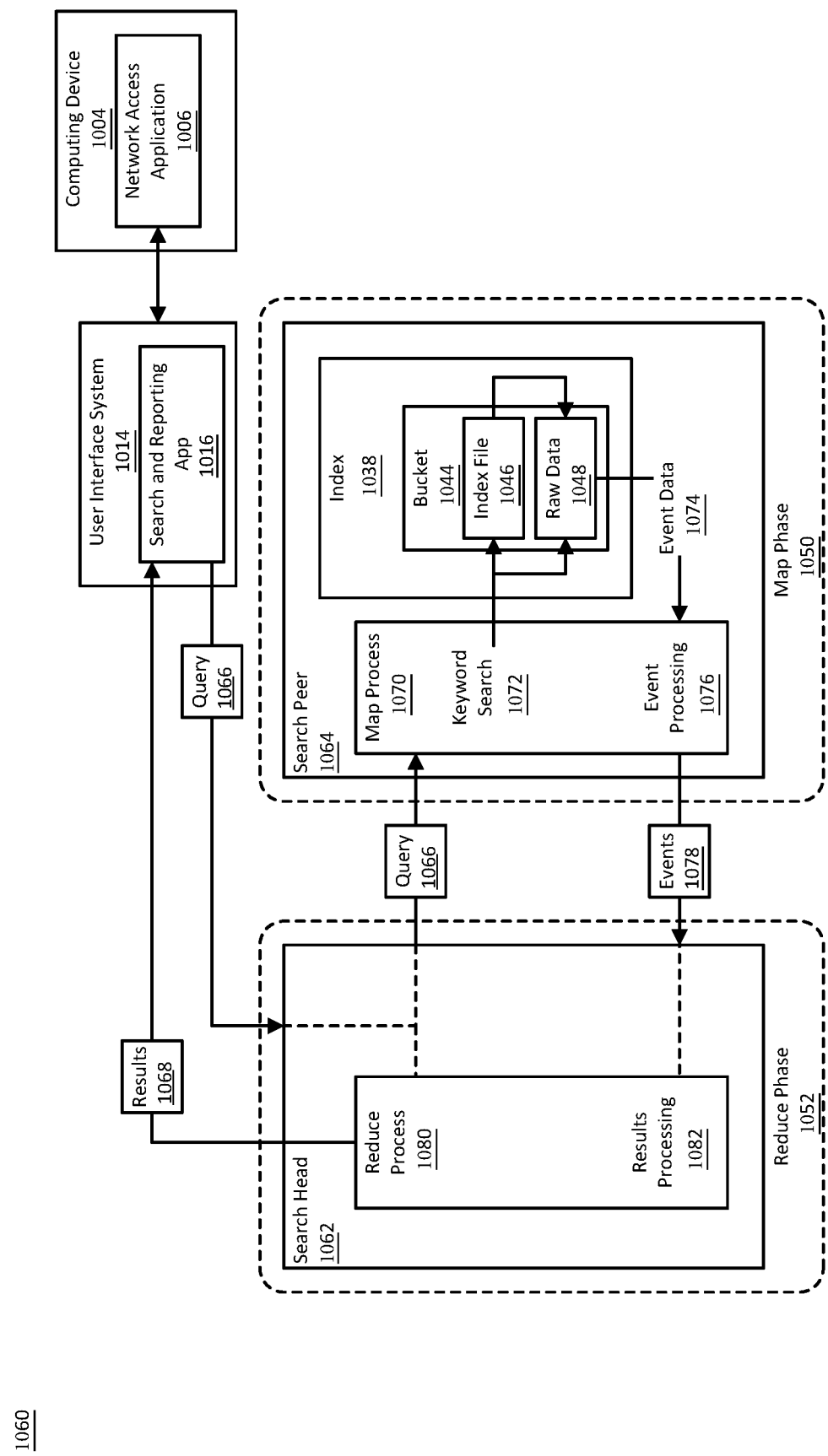
FIG. 10 is a block diagram illustrating in greater detail an example of the search system of a data intake and query system for determining a domain generated by a domain generation algorithm, in accordance with an embodiment of the disclosure.

FIG. 10 is a block diagram illustrating in greater detail an example of the search system 1060 of a data intake and query system, such as the data intake and query system 810 of FIG. 8. The search system 1060 of FIG. 10 issues a query 1066 to a search head 1062, which sends the query 1066 to a search peer 1064. Using a map process 1070, the search peer 1064 searches the appropriate index 1038 for events identified by the query 1066 and sends events 1078 so identified back to the search head 1062. Using a reduce process 1082, the search head 1062 processes the events 1078 and produces results 1068 to respond to the query 1066. The results 1068 can provide useful insights about the data stored in the index 1038. These insights can aid in the administration of information technology systems, in security analysis of information technology systems, and/or in analysis of the development environment provided by information technology systems.

The query 1066 that initiates a search is produced by a search and reporting app 1016 that is available through the user interface system 1014 of the data intake and query system. Using a network access application 1006 executing on a computing device 1004, a user can input the query 1066 into a search field provided by the search and reporting app 1016. Alternatively or additionally, the search and reporting app 1016 can include pre-configured queries or stored queries that can be activated by the user. In some cases, the search and reporting app 1016 initiates the query 1066 when the user enters the query 1066. In these cases, the query 1066 maybe referred to as an "ad-hoc" query. In some cases, the search and reporting app 1016 initiates the query 1066 based on a schedule. For example, the search and reporting app 1016 can be configured to execute the query 1066 once per hour, once per day, at a specific time, on a specific date, or at some other time that can be specified by a date, time, and/or frequency. These types of queries maybe referred to as scheduled queries.

The query 1066 is specified using a search processing language. The search processing language includes commands or search terms that the search peer 1064 will use to identify events to return in the search results 1068. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1066 to include sequential commands, where a subsequent command may operate on the results of a prior command. As an example, sequential commands may be separated in the query 1066 by a vertical line ("|" or "pipe") symbol.

In addition to one or more search commands, the query 1066 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1066 occurs in two broad phases: a map phase 1050 and a reduce phase 1052. The map phase 1050 takes place across one or more search peers. In the map phase 1050, the search peers locate event data that matches the search terms in the search query 1066 and sorts the event data into field-value pairs. When the map phase 1050 is complete, the search peers send events that they have found to one or more search heads for the reduce phase 1052. During the reduce phase 1052, the search heads process the events through commands in the search query 1066 and aggregate the events to produce the final search results 1068.

A search head, such as the search head 1062 illustrated in FIG. 10, is a component of the search system 1060 that manages searches. The search head 1062, which may also be referred to herein as a search management component, can be implemented using program code that can be executed on a computing device. The program code for the search head 1062 can be stored on a non-transitory computer-readable medium and from this medium can be loaded or copied to the memory of a computing device. One or more hardware processors of the computing device can read the program code from the memory and execute the program code in order to implement the operations of the search head 1062.

Upon receiving the search query 1066, the search head 1062 directs the query 1066 to one or more search peers, such as the search peer 1064 illustrated in FIG. 10. "Search peer" is an alternate name for "indexer" and a search peer may be largely similar to the indexer described previously. The search peer 1064 may be referred to as a "peer node" when the search peer 1064 is part of an indexer cluster. The search peer 1064, which may also be referred to as a search execution component, can be implemented using program code that can be executed on a computing device. In some implementations, one set of program code implements both the search head 1062 and the search peer 1064 such that the search head 1062 and the search peer 1064 form one component. In some implementations, the search head 1062 is an independent piece of code that performs searching and no indexing functionality. In these implementations, the search head 1062 may be referred to as a dedicated search head.

The search head 1062 may consider multiple criteria when determining whether to send the query 1066 to the particular search peer 1064. For example, the search system 1060 may be configured to include multiple search peers that each have duplicative copies of at least some of the event data and are implanted using different hardware resources q. In this example, the sending the search query 1066 to more than one search peer allows the search system 1060 to distribute the search workload across different hardware resources. As another example, search system 1060 may include different search peers for different purposes (e.g., one has an index storing a first type of data or from a first data source while a second has an index storing a second type of data or from a second data source). In this example, the search query 1066 may specify which indexes to search, and the search head 1062 will send the query 1066 to the search peers that have those indexes.

To identify events 1078 to send back to the search head 1062, the search peer 1064 performs a map process 1070 to obtain event data 1074 from the index 1038 that is maintained by the search peer 1064. During a first phase of the map process 1070, the search peer 1064 identifies buckets that have events that are described by the time indicator in the search query 1066. As noted above, a bucket contains events whose timestamps fall within a particular range of time. For each bucket 1044 whose events can be described by the time indicator, during a second phase of the map process 1070, the search peer 1064 performs a keyword search 1074 using search terms specified in the search query 1066. The search terms can be one or more of keywords, phrases, fields, Boolean expressions, and/or comparison expressions that in combination describe events being searched for. When segmentation is enabled at index time, the search peer 1064 performs the keyword search 1072 on the bucket's index file 1046. As noted previously, the index file 1046 includes a lexicon of the searchable terms in the events stored in the bucket's raw data 1048 file. The keyword search 1072 searches the lexicon for searchable terms that correspond to one or more of the search terms in the query 1066. As also noted above, the lexicon incudes, for each searchable term, a reference to each location in the raw data 1048 file where the searchable term can be found. Thus, when the keyword search identifies a searchable term in the index file 1046 that matches a search term in the query 1066, the search peer 1064 can use the location references to extract from the raw data 1048 file the event data 1074 for each event that include the searchable term.

In cases where segmentation was disabled at index time, the search peer 1064 performs the keyword search 1072 directly on the raw data 1048 file. To search the raw data 1048, the search peer 1064 may identify searchable segments in events in a similar manner as when the data was indexed. Thus, depending on how the search peer 1064 is configured, the search peer 1064 may look at event fields and/or parts of event fields to determine whether an event matches the query 1066. Any matching events can be added to the event data 1074 read from the raw data 1048 file. The search peer 1064 can further be configured to enable segmentation at search time, so that searching of the index 1038 causes the search peer 1064 to build a lexicon in the index file 1046.

The event data 1074 obtained from the raw data 1048 file includes the full text of each event found by the keyword search 1072. During a third phase of the map process 1070, the search peer 1064 performs event processing 1076 on the event data 1074, with the steps performed being determined by the configuration of the search peer 1064 and/or commands in the search query 1066. For example, the search peer 1064 can be configured to perform field discovery and field extraction. Field discovery is a process by which the search peer 1064 identifies and extracts key-value pairs from the events in the event data 1074. The search peer 1064 can, for example, be configured to automatically extract the first 100 fields (or another number of fields) in the event data 1074 that can be identified as key-value pairs. As another example, the search peer 1064 can extract any fields explicitly mentioned in the search query 1066. The search peer 1064 can, alternatively or additionally, be configured with particular field extractions to perform.

Other examples of steps that can be performed during event processing 1076 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1064 sends processed events 1078 to the search head 1062, which performs a reduce process 1080. The reduce process 1080 potentially receives events from multiple search peers and performs various results processing 1082 steps on the received events. The results processing 1082 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1082 can further include applying commands from the search query 1066 to the events. The query 1066 can include, for example, commands for evaluating and/or manipulating fields (e.g., to generate new fields from existing fields or parse fields that have more than one value). As another example, the query 1066 can include commands for calculating statistics over the events, such as counts of the occurrences of fields, or sums, averages, ranges, and so on, of field values. As another example, the query 1066 can include commands for generating statistical values for purposes of generating charts of graphs of the events.

The reduce process 1080 outputs the events found by the search query 1066, as well as information about the events. The search head 1062 transmits the events and the information about the events as search results 1068, which are received by the search and reporting app 1016. The search and reporting app 1016 can generate visual interfaces for viewing the search results 1068. The search and reporting app 1016 can, for example, output visual interfaces for the network access application 1006 running on a computing device 1004 to generate.

The visual interfaces can include various visualizations of the search results 1068, such as tables, line or area charts, Chloropleth maps, or single values. The search and reporting app 1016 can organize the visualizations into a dashboard, where the dashboard includes a panel for each visualization. A dashboard can thus include, for example, a panel listing the raw event data for the events in the search results 1068, a panel listing fields extracted at index time and/or found through field discovery along with statistics for those fields, and/or a timeline chart indicating how many events occurred at specific points in time (as indicated by the timestamps associated with each event). In various implementations, the search and reporting app 1016 can provide one or more default dashboards. Alternatively or additionally, the search and reporting app 1016 can include functionality that enables a user to configure custom dashboards.

The search and reporting app 1016 can also enable further investigation into the events in the search results 1016. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1066. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 11:
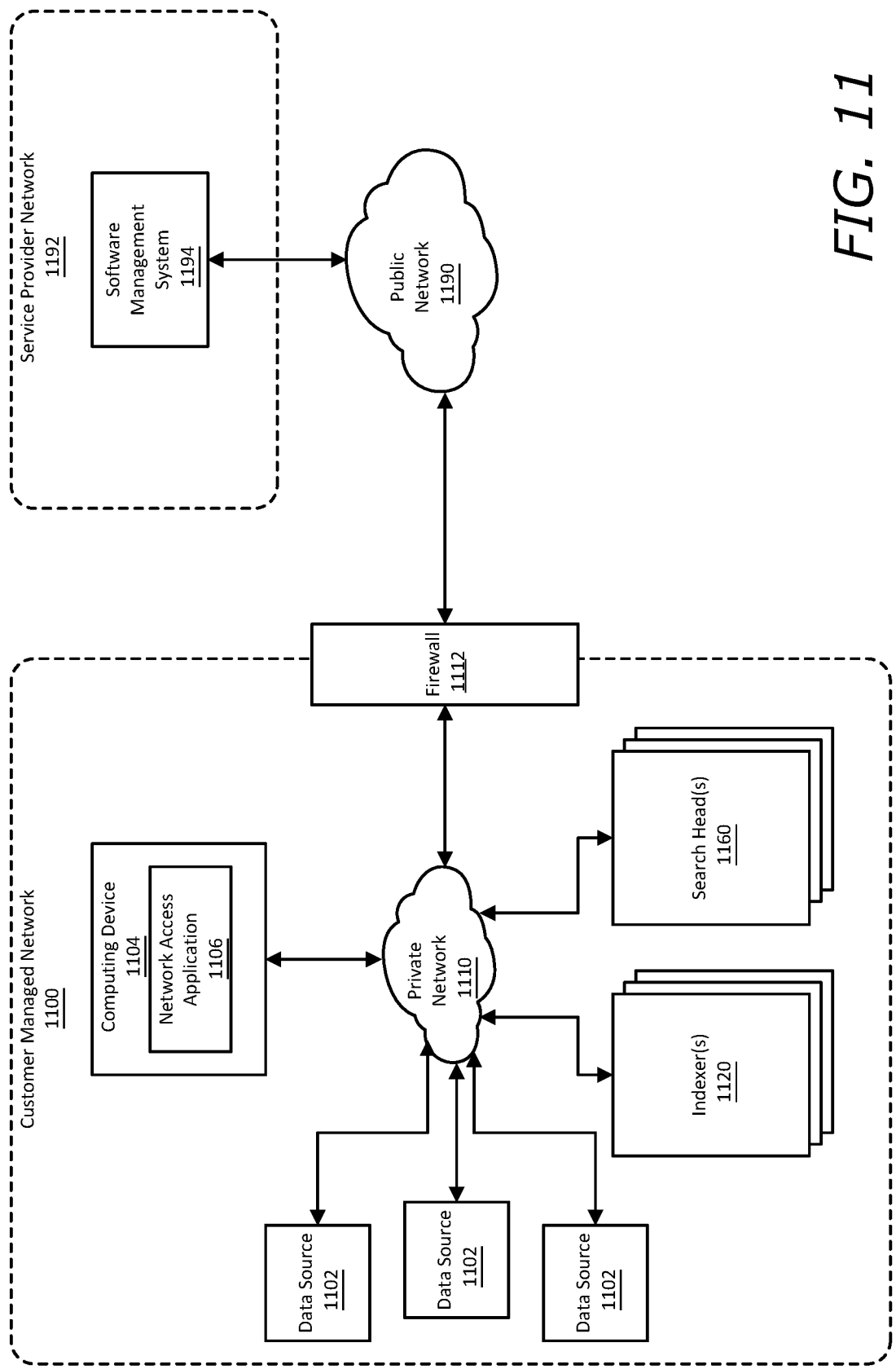
FIG. 11 is an example of a self-managed network that includes a data intake and query system for determining a domain generated by a domain generation algorithm, in accordance with an embodiment of the disclosure.

FIG. 11 illustrates an example of a self-managed network 1100 that includes a data intake and query system. "Self-managed" in this instance means that the entity that is operating the self-managed network 1100 configures, administers, maintains, and/or operates the data intake and query system using its own compute resources and people. Further, the self-managed network 1100 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 1100 is located within the customer's on-prem environment, such as in the entity's data center, the operation and management of the self-managed network 1100, including of the resources in the self-managed network 1100, is under the control of the entity. For example, administrative personnel of the entity have complete access to and control over the configuration, management, and security of the self-managed network 1100 and its resources.

The self-managed network 1100 can execute one or more instances of the data intake and query system. An instance of the data intake and query system may be executed by one or more computing devices that are part of the self-managed network 1100. A data intake and query system instance can comprise an indexing system and a search system, where the indexing system includes one or more indexers 1120 and the search system includes one or more search heads 1160.

As depicted in FIG. 11, the self-managed network 1100 can include one or more data sources 1102. Data received from these data sources may be processed by an instance of the data intake and query system within self-managed network 1100. The data sources 1102 and the data intake and query system instance can be communicatively coupled to each other via a private network 1110.

Users associated with the entity can interact with and avail themselves of the functions performed by a data intake and query system instance using computing devices. As depicted in FIG. 11, a computing device 1104 can execute a network access application 1106 (e.g., a web browser), that can communicate with the data intake and query system instance and with data sources 1102 via the private network 1110. Using the computing device 1104, a user can perform various operations with respect to the data intake and query system, such as management and administration of the data intake and query system, generation of knowledge objects, and other functions. Results generated from processing performed by the data intake and query system instance may be communicated to the computing device 1104 and output to the user via an output system (e.g., a screen) of the computing device 1104.

The self-managed network 1100 can also be connected to other networks that are outside the entity's on-premise environment/network, such as networks outside the entity's data center. Connectivity to these other external networks is controlled and regulated through one or more layers of security provided by the self-managed network 1100. One or more of these security layers can be implemented using firewalls 1112. The firewalls 1112 form a layer of security around the self-managed network 1100 and regulate the transmission of traffic from the self-managed network 1100 to the other networks and from these other networks to the self-managed network 1100.

Networks external to the self-managed network can include various types of networks including public networks 1190, other private networks, and/or cloud networks provided by one or more cloud service providers. An example of a public network 1190 is the Internet. In the example depicted in FIG. 11, the self-managed network 1100 is connected to a service provider network 1192 provided by a cloud service provider via the public network 1190.

In some implementations, resources provided by a cloud service provider may be used to facilitate the configuration and management of resources within the self-managed network 1100. For example, configuration and management of a data intake and query system instance in the self-managed network 1100 may be facilitated by a software management system 1194 operating in the service provider network 1192. There are various ways in which the software management system 1194 can facilitate the configuration and management of a data intake and query system instance within the self-managed network 1100. As one example, the software management system 1194 may facilitate the download of software including software updates for the data intake and query system. In this example, the software management system 1194 may store information indicative of the versions of the various data intake and query system instances present in the self-managed network 1100. When a software patch or upgrade is available for an instance, the software management system 1194 may inform the self-managed network 1100 of the patch or upgrade. This can be done via messages communicated from the software management system 1194 to the self-managed network 1100.

The software management system 1194 may also provide simplified ways for the patches and/or upgrades to be downloaded and applied to the self-managed network 1100. For example, a message communicated from the software management system 1194 to the self-managed network 1100 regarding a software upgrade may include a Uniform Resource Identifier (URI) that can be used by a system administrator of the self-managed network 1100 to download the upgrade to the self-managed network 1100. In this manner, management resources provided by a cloud service provider using the service provider network 1192 and which are located outside the self-managed network 1100 can be used to facilitate the configuration and management of one or more resources within the entity's on-prem environment. In some implementations, the download of the upgrades and patches may be automated, whereby the software management system 1194 is authorized to, upon determining that a patch is applicable to a data intake and query system instance inside the self-managed network 1100, automatically communicate the upgrade or patch to self-managed network 1100 and cause it to be installed within self-managed network 1100.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving a character set as an input;
   converting the input into an integer array containing indexes of characters within the character set;
   generating an input vector from the integer array, wherein the input vector is a dense numerical representation of the character set;
   passing the input vector into a machine learning model thereby generating a machine learning output vector;
   generating a plurality of features based on the character set, wherein the plurality of features, obtained from the character set, comprises at least one of an n-gram similarity score of the character set with a predetermined dictionary of words, an n-gram similarity score of the character set with a set of legitimate domains, or an online web traffic ranking service;
   concatenating the plurality of features with the machine learning output vector to form a dense input vector; and
   processing the dense input vector resulting in a comparison score that is indicative of a probability that the character set was generated by a domain generation algorithm (DGA).

2. The computer-implemented method of claim 1, wherein generating the input vector further comprises padding the integer array to obtain a fixed length integer array.

3. The computer-implemented method of claim 1, wherein generating the input vector having the dense numerical representation of the character set includes quantifying a semantic similarity between the character set and an internet domain name.

4. The computer-implemented method of claim 1, wherein the machine learning model is selected from a group consisting of: a recurrent neural network (RNN), a long short-term memory network (LSTM), a feedforward neural network (FNN), and a convolutional neural network (CNN).

5. The computer-implemented method of claim 1, wherein the processing the dense input vector resulting in the comparison score includes application of a non-linear transform to the dense input vector.

6. The computer-implemented method of claim 1, further comprising:
   performing a threshold comparison with the comparison score and a predetermined threshold; and
   based on a result of the threshold comparison, determining whether the character set was generated by the DGA.

7. The computer-implemented method of claim 1, wherein the input vector output from the machine learning model is concatenated with selected features generated from one or more internet domain names.

8. A computing device, comprising:
   a processor; and
   a non-transitory computer-readable medium having stored thereon instructions that, when executed by the processor, cause the processor to perform operations including:
   receiving a character set as an input;
   converting the input into an integer array containing indexes of characters within the character set;
   generating an input vector from the integer array, wherein the input vector is a dense numerical representation of the character set;
   passing the input vector into a machine learning model thereby generating a machine learning output vector;
   generating a plurality of features based on the character set, wherein the plurality of features, obtained from the character set, comprises at least one of an n-gram similarity score of the character set with a predetermined dictionary of words, an n-gram similarity score of the character set with a set of legitimate domains, or an online web traffic ranking service;
   concatenating the plurality of features with the machine learning output vector to form a dense input vector; and processing the dense input vector resulting in a comparison score that is indicative of a probability that the character set was generated by a domain generation algorithm (DGA).

9. The computing device of claim 8, wherein generating the input vector further comprises padding the integer array to obtain a fixed length integer array.

10. The computing device of claim 8, wherein generating the input vector having the dense numerical representation of the character set includes quantifying a semantic similarity between the character set and an internet domain name.

11. The computing device of claim 8, wherein the machine learning model is selected from a group consisting of: a recurrent neural network (RNN), a long short-term memory network (LSTM), a feedforward neural network (FNN), and a convolutional neural network (CNN).

12. The computing device of claim 8, wherein the processing the dense input vector resulting in the comparison score includes application of a non-linear transform to the dense input vector.

13. The computing device of claim 8, wherein the operations further include:
performing a threshold comparison with the comparison score and a predetermined threshold; and
based on a result of the threshold comparison, determining whether the character set was generated by the DGA.

14. The computing device of claim 8, wherein the input vector output from the machine learning model is concatenated with selected features generated from one or more internet domain names.

15. A non-transitory computer-readable medium having stored thereon instructions that, when executed by one or more processors, cause the one or more processor to perform operations including:
receiving a character set as an input;
converting the input into an integer array containing indexes of characters within the character set;
generating an input vector from the integer array, wherein the input vector is a dense numerical representation of the character set;
passing the input vector into a machine learning model thereby generating a machine learning output vector;
generating a plurality of features based on the character set, wherein the plurality of features, obtained from the character set, comprises at least one of an n-gram similarity score of the character set with a predetermined dictionary of words, an n-gram similarity score of the character set with a set of legitimate domains, or an online web traffic ranking service;
concatenating the plurality of features with the machine learning output vector to form a dense input vector; and
processing the dense input vector resulting in a comparison score that is indicative of a probability that the character set was generated by a domain generation algorithm (DGA).

16. The non-transitory computer-readable medium of claim 15, wherein generating the input vector further comprises padding the integer array to obtain a fixed length integer array.

17. The non-transitory computer-readable medium of claim 15, wherein generating the input vector having the dense numerical representation of the character set includes quantifying a semantic similarity between the character set and an internet domain name.

18. The non-transitory computer-readable medium of claim 15, wherein the machine learning model is selected from a group consisting of: a recurrent neural network (RNN), a long short-term memory network (LSTM), a feedforward neural network (FNN), and a convolutional neural network (CNN).

19. The non-transitory computer-readable medium of claim 15, wherein the processing the dense input vector resulting in the comparison score includes application of a non-linear transform to the dense input vector.

20. The non-transitory computer-readable medium of claim 15, wherein the operations further include:
performing a threshold comparison with the comparison score and a predetermined threshold; and
based on a result of the threshold comparison, determining whether the character set was generated by the DGA.

* * * * *